United States Patent
Kamei et al.

(10) Patent No.: US 8,326,811 B2
(45) Date of Patent: Dec. 4, 2012

(54) FILE MANAGEMENT METHOD AND COMPUTER SYSTEM

(75) Inventors: Hitoshi Kamei, Sagamihara (JP); Takaki Nakamura, Ebina (JP)

(73) Assignee: Hitachi, Ltd., Tokyo (JP)

( * ) Notice: Subject to any disclaimer, the term of this patent is extended or adjusted under 35 U.S.C. 154(b) by 133 days.

(21) Appl. No.: 12/991,784

(22) PCT Filed: Oct. 26, 2010

(86) PCT No.: PCT/JP2010/006315
§ 371 (c)(1),
(2), (4) Date: Nov. 9, 2010

(87) PCT Pub. No.: WO2012/056493
PCT Pub. Date: May 3, 2012

(65) Prior Publication Data
US 2012/0102005 A1    Apr. 26, 2012

(51) Int. Cl.
*G06F 17/30* (2006.01)

(52) U.S. Cl. .................................................. 707/693
(58) Field of Classification Search ................... None
See application file for complete search history.

(56) References Cited

U.S. PATENT DOCUMENTS

| | | | |
|---|---|---|---|
| 7,496,586 B1 * | 2/2009 | Bonwick et al. | 1/1 |
| 2006/0230014 A1 | 10/2006 | Kedem et al. | |
| 2008/0307191 A1 * | 12/2008 | Lane et al. | 711/209 |

* cited by examiner

*Primary Examiner* — Syed Hasan
(74) *Attorney, Agent, or Firm* — Volpe And Koenig, P.C.

(57) ABSTRACT

To inhibit deterioration in the I/O performance of a file even if the file includes an area that is frequently accessed.
An access account of the file is recorded, an area of the file is split into a plurality of partial areas at least one or more times if the access count exceeds a split threshold, the partial area (partial area including a hotspot with frequent access) in which the access count exceeded the split threshold is minimized, data corresponding to that partial area is ultimately uncompressed, and data corresponding to the other partial areas is compressed.

14 Claims, 22 Drawing Sheets

FILE MANAGEMENT METHOD AND COMPUTER SYSTEM

TECHNICAL FIELD

The present invention relates to a file management method and a computer system for managing files using a file system equipped with a compression function.

BACKGROUND ART

In recent years, the volume of data to be saved in file servers is increasing sharply. In order to reduce the data retention cost of file servers, the file compression function capable of reducing the data capacity of files stored in file servers is attracting attention.

The file compression function can be used according to two methods. One method is where, for example, an end user or a file server administrator stores a file in a file server and thereafter compresses the file using a command such as a ZIP command.

The other method is where, when an end user stores a file, the file system of the file server transparently compresses the file (hereinafter referred to as the "file system compression").

The latter method according to the file system compression is superior in comparison to the former method of file compression using a command in that the disk capacity required for the file compression is small. When a command is used, an uncompressed file is temporarily stored in a file server, and the file is thereafter compressed.

Meanwhile, with the method according to the file system compression, since the file system compresses the file received from the end user on the memory and stores the compressed file on a disk, therefore the uncompressed file is not stored in the file server. In other words, since the file server always stores compressed data, the required disk capacity can be reduced.

As an example that employs the file system compression, for instance, as described in PTL 1, an appliance is installed between a PC (Personal Computer) used by end user and a file server via LAN. The appliance receives data from the PC, and then compresses the data. Finally the appliance stores the compressed data into the file server.

PTL 1 describes that the overhead required for decompressing the file can be suppressed by dividing the file into fixed-length parts (such parts are hereinafter referred to as the "clusters"), and compressing or decompressing data of the respective clusters.

If all data of the file to be stored in the file server is compressed into a one data section, the file system needs to decompress all data of the file each time when the end user accesses the file, and the load will thereby increase.

Meanwhile, as described in PTL 1, if the file is divided into a plurality of clusters and data of the respective clusters is compressed or decompressed, there is no need to decompress the data of the entire file at once, and the overhead required for decompressing the file can be reduced.

Citation List

Patent Literature
PTL 1: US2006/0230014A1

SUMMARY OF INVENTION

Technical Problem

If a file is split into a plurality of clusters, among the clusters, there are those which are accessed frequently and those which are not accessed frequently. With a cluster including a data area that is frequently read and rewritten (hereinafter referred to as the "hotspot"), since compression and decompression processing are repeated each time it is accessed, the load of accessing the area will be higher than a cluster that is not accessed frequently.

Thus, PTL 1 describes how to alleviate the load of accessing a cluster that includes a hotspot by storing the decompressed data in a cache memory.

Nevertheless, since the capacity of a cache memory is limited, the load cannot be alleviated if the data to be stored in the cache memory overflows from the cache memory.

The present invention was devised in view of the problems of the conventional technology described above. Thus, an object of this invention is to provide a file management method and a computer system capable of inhibiting deterioration in the I/O performance of a file even if the file includes an area that is frequently accessed.

Solution to Problem

In order to achieve the foregoing object, the present invention is characterized in that it records an access count by associating it with an area of the file if the processing request is a file access request, manages the area of the file as a split target area if the recorded access count exceeds a split threshold, splits the split target area into a plurality of partial areas at least one or more times, and, among the plurality of partial areas obtained with the split, manages the partial area in which the access count exceeded the split threshold as a non-compression target area, and manages the partial area in which the access count is less than the split threshold as a compression target area.

ADVANTAGEOUS EFFECTS OF INVENTION

According to the present invention, it is possible to inhibit deterioration in the I/O performance of a file even if the file includes an area that is frequently accessed.

DESCRIPTION OF EMBODIMENTS

The embodiments explained below are merely illustrative, and the present invention is not limited to the following embodiments.

(First Embodiment)

In the first embodiment, access account of the file is recorded, an area of the file is split into a plurality of partial areas at least one or more times if the access count exceeds a split threshold, the partial area (partial area including a hotspot with frequent access) in which the access count exceeded the split threshold is minimized, data corresponding to that partial area is ultimately uncompressed, and data corresponding to the other partial areas is compressed.

Figure 1:
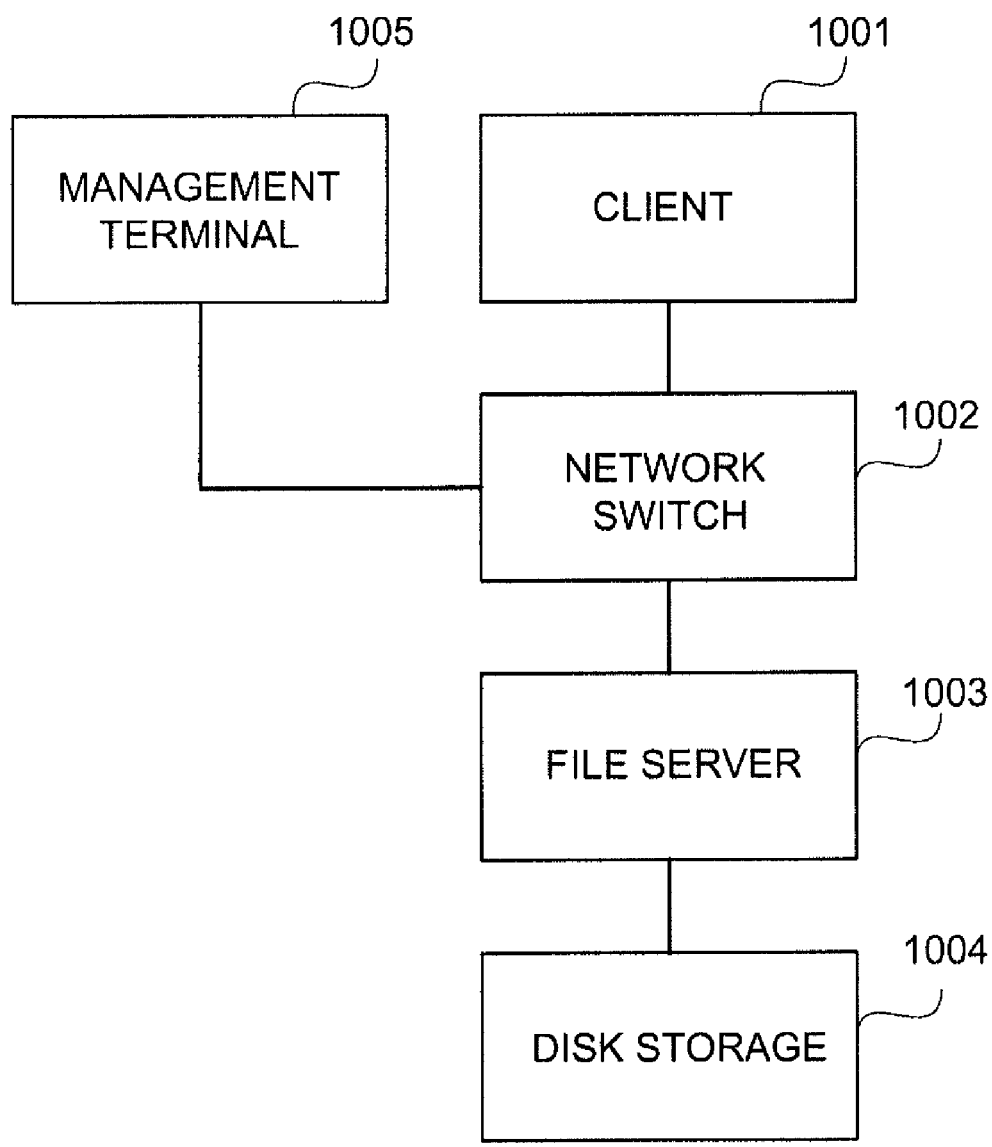
FIG. 1 is a block configuration diagram showing the overall configuration of the present invention.

FIG. 1 is a block configuration diagram that shows the overall configuration of the file sharing system according to the present invention. In FIG. 1, the file sharing system is configured as a computer system including a client 1001, a network switch 1002, a file server 1003, a disk storage 1004, and a management terminal 1005. The client 1001 and the file server 1003 are connected to the network switch 1002, and the disk storage 1004 is connected to the file server 1003.

The client 1001 is a computer to be used by an end user for using the file sharing system. The internal configuration and internal processing will be described later.

The network switch 1002 is a device for respectively connecting the client 1001, the management terminal 1005 and the file server 1003 via a LAN (Local Area Network). However, a wireless communication device or the like may be used for configuring the LAN, and the present invention is not limited to the foregoing mode of connection.

The file server 1003 is a computer for providing a file sharing service to the end user using the client 1001. The internal configuration and internal processing will be described later.

The disk storage 1004 is a disk device for storing the data of files that are managed with the file server 1003.

The disk storage 1004 is connected to the file server 1003 via an FC (Fibre Channel) protocol. However, other protocol such as iSCSI (Small Computer System Interface over Internet) may be used for the connection of the file server 1003 and the disk storage 1004. The present invention does not limit the mode of connection of the file server 1003 and the disk storage 1004.

The management terminal 1005 is a computer that is used by a system administrator for managing the file sharing system in the present invention. The internal configuration and internal processing of the management terminal 1005 will be described later.

Figure 2:
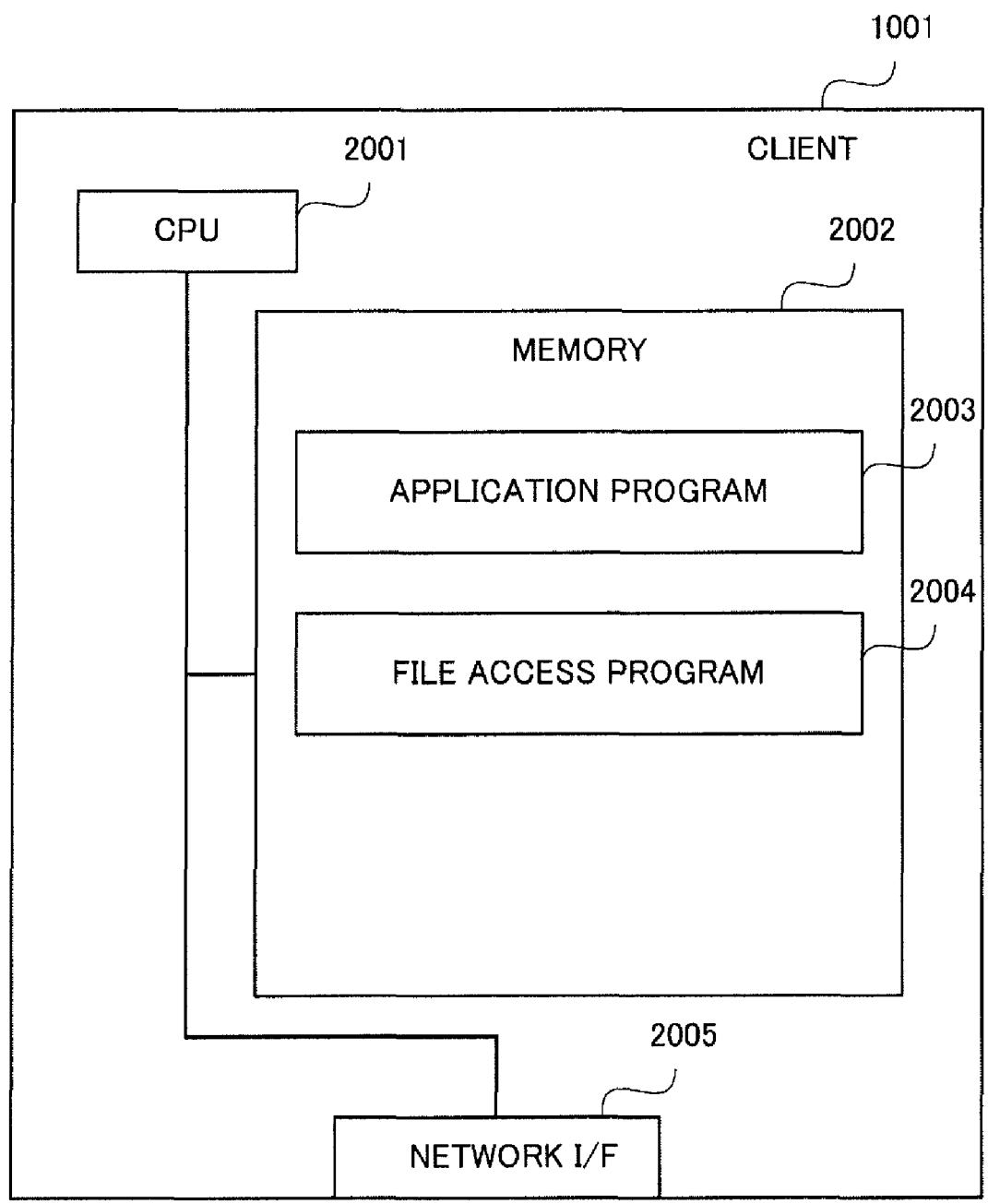
FIG. 2 is a block configuration diagram showing the configuration of a client.

FIG. 2 is a block configuration diagram showing an internal configuration example of the client 1001 in the present invention.

In FIG. 2, the client 1001 is configured as client terminal including a CPU (Central Processing Unit) 2001, a memory 2002, and a network interface 2005, and these are mutually connected via an internal communication bus.

The CPU 2001 executes an application program 2003 and a file access program 2004 stored on the memory 2002.

The application program 2003 is a program that is used by the end user and is, for example, a spreadsheet program.

The file access program 2004 is a program to access the file sharing service that file server provides for the end user. When the application program 2003 accesses a file of the file server 1003 via the LAN, the file access program 2004 sends a file access request to the file server 1003. The file access program 2004 thereafter receives the file access result from the file server 1003, and returns the received file access result to the application program 2003. The detailed operation of the client 1001 will be described later.

Figure 3:
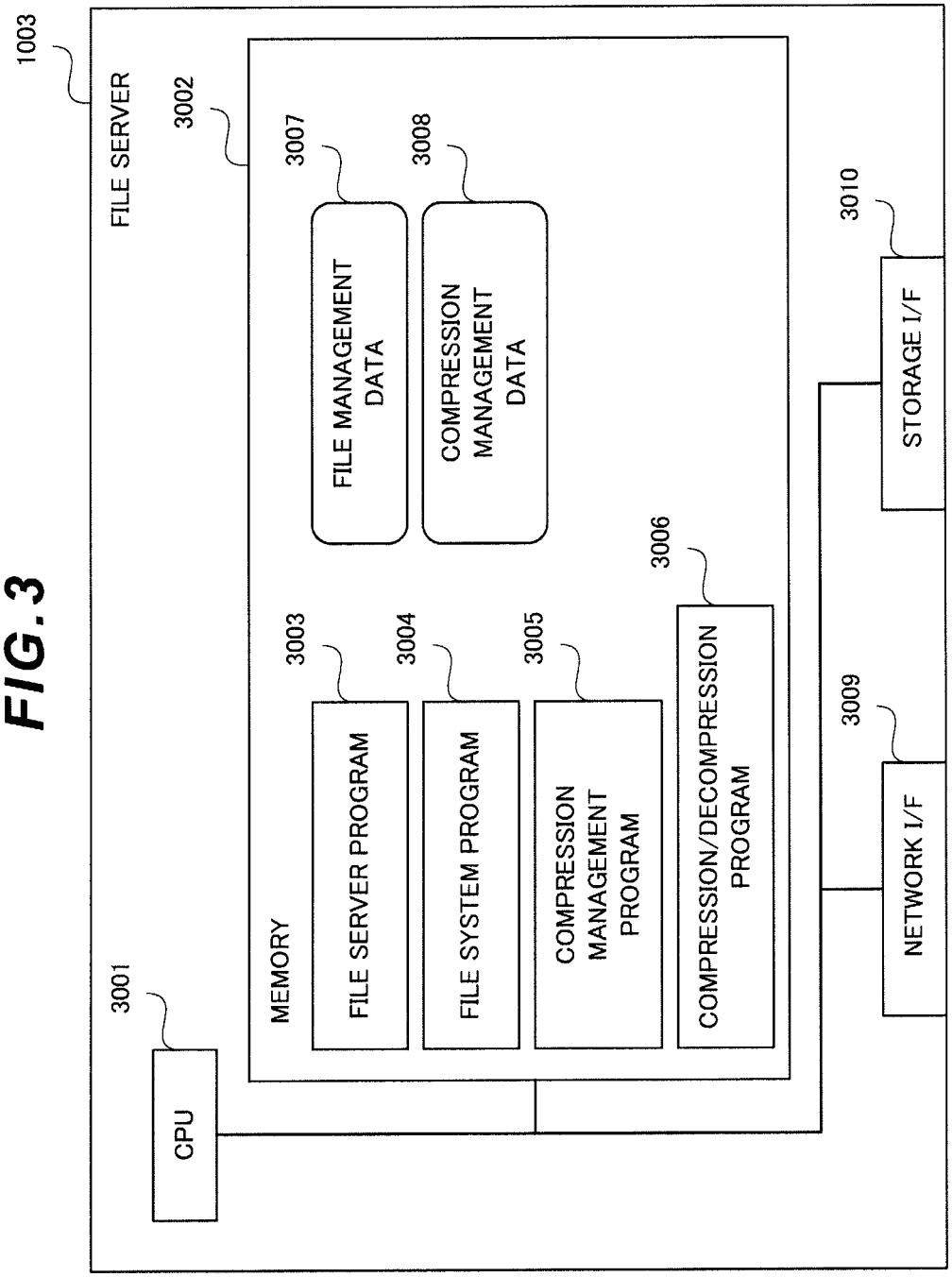
FIG. 3 is a block configuration diagram showing the configuration of a file server.

FIG. 3 is a block configuration diagram showing an internal configuration example of the file server 1003 in the present invention.

In FIG. 3, the file server 1003 is configured as a computer including a CPU 3001, a memory 3002, a network interface 3009, and a storage interface 3010, and these are mutually connected via an internal communication bus.

The CPU 3001 is configured as a controller for executing a file server program 3003, a file system program 3004, a compression management program 3005, and a compression/decompression program 3006 stored in the memory 3002. Here, the CPU 3001 executes the program when the client 1001 or the management terminal 1005 request process.

The memory 3002 stores file management data 3007 and compression management data 3008. The program executed by the CPU 3001 uses the file management data 3007 and the compression management data 3008 upon compressing and decompressing the file data.

Here, a file is a collection of data (data group) with certain relativity, and includes the file body or file substance as real data, and metadata. However, the file is sometimes simply referred to as a file without differentiating the file body or file substance and the metadata.

Metadata is attribute information of the file, including information related to the file path, file size, file existence, hash value of the file, date and time of update of the file, stub existence and the like.

The file server program 3003 receives a file access request from the file access program 2004 of the client 1001. The file server program 3003 is a program, and uses the file system program 3004 to access data of the files stored in the disk storage 1004. Here, the compression management program 3005 compresses and decompresses the file data. In other words, the compression management program 3005 compresses and decompresses the file data according to the access request from the client 1001. The process of the file server 1003 will be described later.

Figure 4:
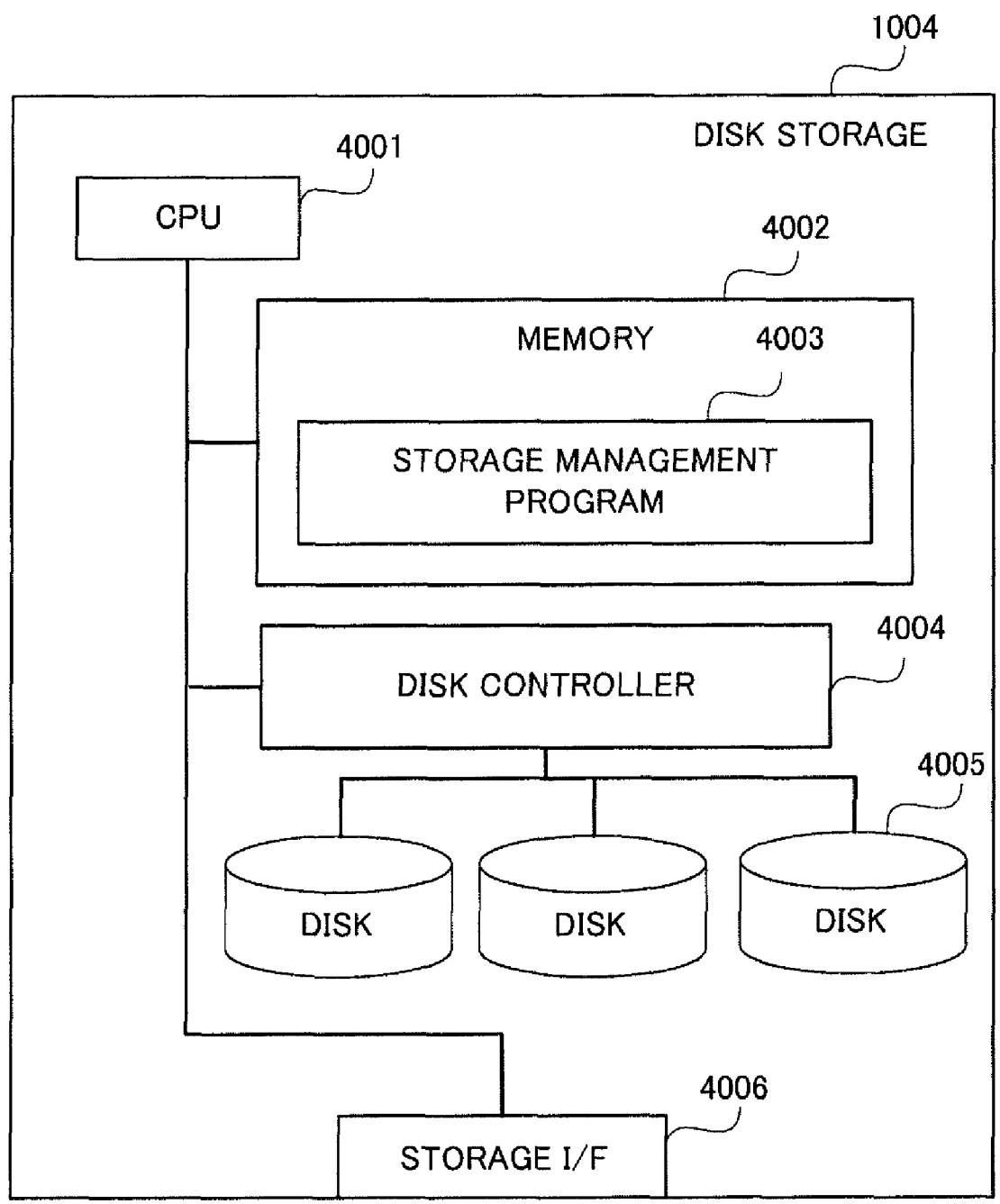
FIG. 4 is a block configuration diagram showing the configuration of a disk device.

FIG. 4 is a block configuration diagram showing an internal configuration example of the disk storage 1004 in the present invention.

In FIG. 4, the disk storage 1004 includes a CPU 4001, a memory 4002, a disk controller 4004, and a storage interface 4006, and these are mutually connected via an internal communication bus.

The disk controller 4004 is also connected to the disk 4005, and controls the I/O processing (read processing/write processing) of data from and to the disk 4005. Here, the disk controller 4004 includes a RAID (Redundant Arrays of Inexpensive Disks) function, and is able to configure a plurality of disks 4005 as a RAID group, and improve the fault tolerance of the disk device by realizing the redundancy of a plurality of disks 4005.

The CPU 4001 executes a storage management program 4003 stored on the memory 4002. The storage management program 4003 is a program for managing the RAID function of the disk controller 4004. For example, the storage management program 4003 sets the configuration of the disk devices to be made redundant.

In the present invention, the disk storage 1004 may be a special storage apparatus, or a storage apparatus without the redundancy function. In addition, an optical disk or a tape device may also be used. In other words, the present invention is not limited to a storage device for storing file data.

Figure 5:
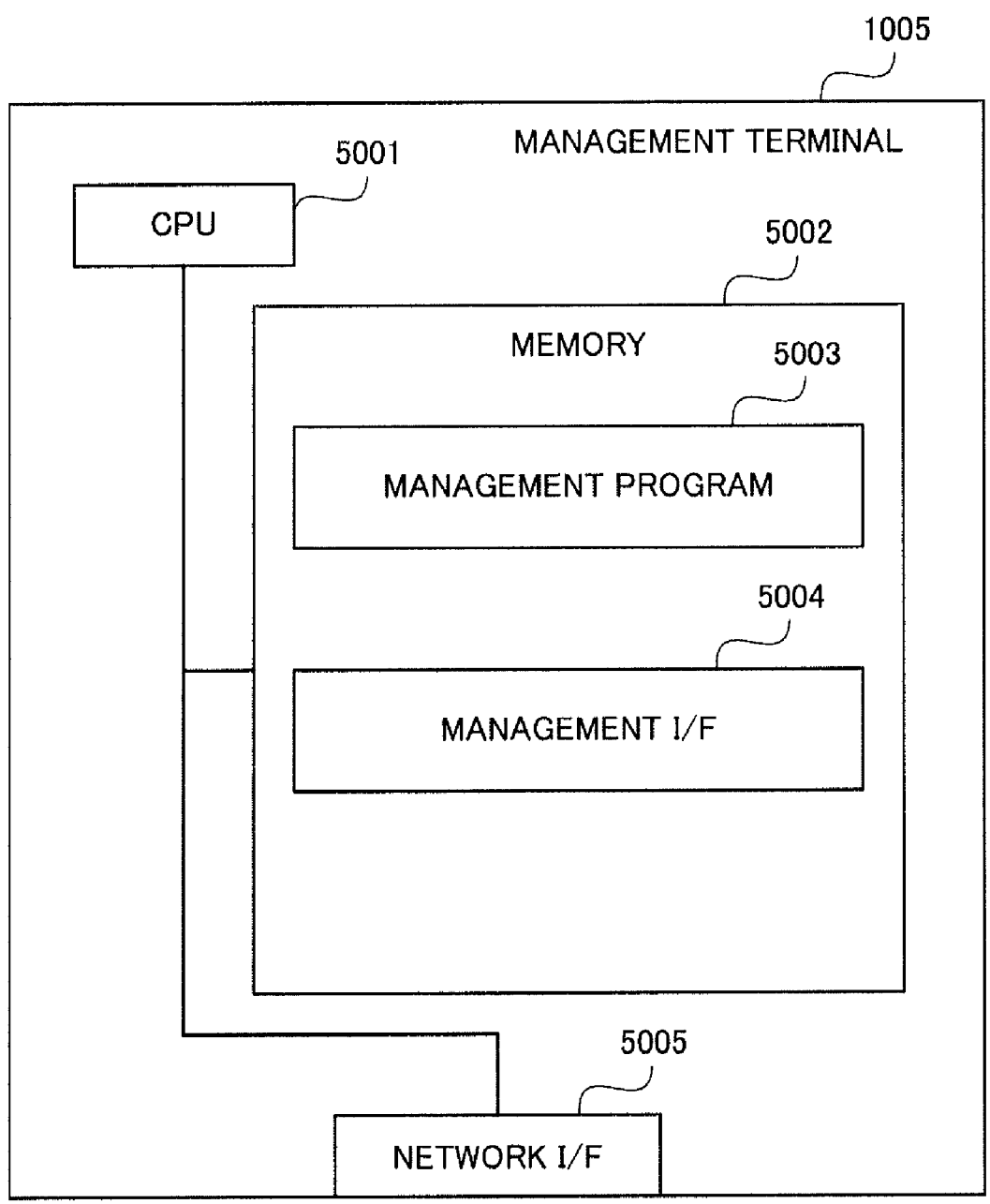
FIG. 5 is a block configuration diagram showing the configuration of a management terminal.

FIG. 5 is a block configuration diagram showing an internal configuration example of the management terminal 1005 in the present invention.

In FIG. 5, the management terminal 1005 includes a CPU 5001, a memory 5002, and a network interface 5005, and these are mutually connected via an internal communication bus.

The CPU 5001 executes a management program 5003 and a management side interface 5004 stored in the memory 5002.

The management program 5003 is a program for providing, to the system administrator, the function of managing the file sharing system in the present invention through the management side interface 5004.

When the system administrator inputs management data into the management side interface 5004, such management data is conveyed to the management program 5004. The management program 5003 sets the file server 1003 according to the input management data. The processing contents of the management program 5003 and details regarding the management side interface 5004 will be described later.

Figure 6:
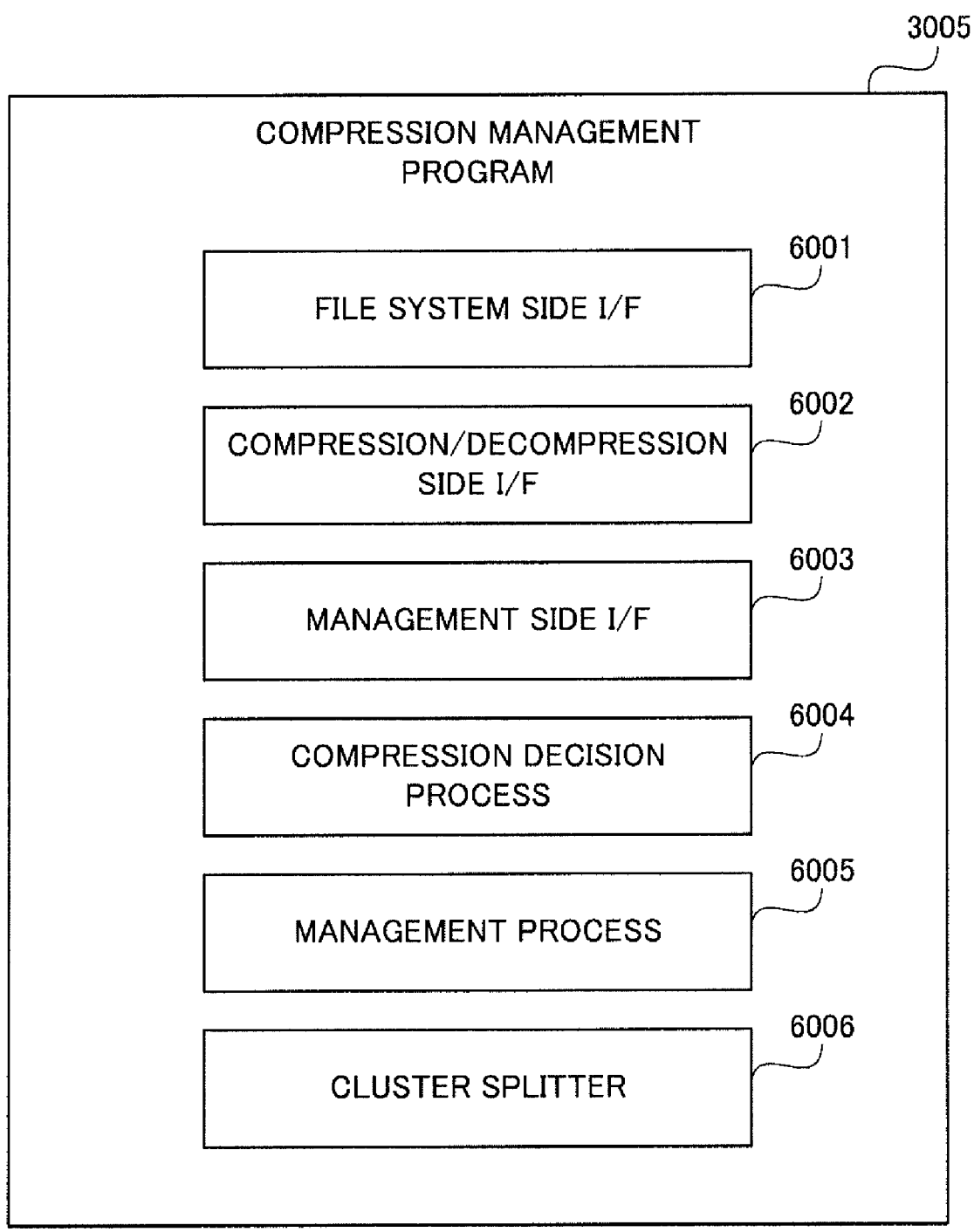
FIG. 6 is a block configuration diagram showing the module configuration of a compression management program.

FIG. 6 is a block configuration diagram showing an internal configuration example of the compression management program 3005 stored in the memory 3002 of the file server 1003.

In FIG. 6, the compression management program 3005 is configured from a file system side interface 6001, a compression/decompression side interface 6002, a management side interface 6003, a compression decision processing unit 6004, a management processing unit 6005, and a cluster split processing unit 6006.

The file system side interface 6001 is an interface for communicating between the file system program 3004 and the compression management program 3005 of the file server 1003. An example of the formats of the file system side interface 6001 is shown in (A1), (A2) and (A3) below.

$$\text{int compress\_data(input\_data,file\_path,size,access\_info)} \quad (A1)$$

$$\text{int decompress\_data(output\_data,file\_path,size,access\_info)} \quad (A2)$$

$$\text{int split\_cluster(file\_path,access\_info)} \quad (A3)$$

Format (A1) is a compression request interface of the file system side interface 6001. A compression request interface receives, as arguments, input_data that is the memory address where the compression target data is stored, file_path that indicates the file path of the compression target file, and access information that has the size of the compression target data, file access location and access size.

Format (A2) is a decompression request interface of the file system side interface 6002. A decompression request interface receives, as arguments, output_data that is the memory address where the decompression target data is stored, file_path that indicates the file path of the decompression target data, memory address where the size after compression is stored, and access information that has the file access location and access size.

Format (A3) is a cluster split request interface of the file system side interface 6002. The cluster split request interface receives, as arguments, the file name and access information including the file access location and access size.

The compression/decompression side interface 6002 is an interface for communicating with the compression/decompression program 3006. An example of the formats of the compression/decompression side interface 6002 is shown in (B1) and (B2) below.

$$\text{int compress(in\_data,compressed\_data,input\_size, compressed\_size)} \quad (B1)$$

$$\text{int decompress(compressed\_data,out\_data,compressed\_size,out\_size)} \quad (B2)$$

Format (B1) is a compression request interface of the compression/decompression side interface 6002. The compression request interface receives, as arguments, in_data that is the memory address of the compression target data, compressed_data that is the memory address of data after compression, input_size that is the size of the compression target data, and compressed_size that is the size of data after compression.

Format (B2) is a decompression request interface of the compression/decompression side interface 6002. The decompression request interface receives, as arguments, compressed_data that is the memory address of the decompression target data, out_data that is the memory address of data after decompression, compressed_size that is the size of the decompression target data, and out_size that is the size of data after decompression.

The management side interface 6003 is an interface for communicating with the management program 5003 of the management terminal 1005. An example of the formats of the management side interface 6003 is shown in (C1) and (C2) below.

$$\text{int management(management\_information)} \quad (C1)$$

$$\text{int combine\_cluster(file\_name)} \quad (C2)$$

Format (C1) is a management side interface of the management side interface 6003. The management side interface receives, as an argument, management_information which is management data.

Format (C2) is a cluster combine request interface of the file system side interface 6002. The cluster combine request interface receives, as an argument, file_path which is the file path of the combine target file. Process that uses the foregoing interfaces will be explained later in detail.

The compression decision processing unit 6004 is a module for processing a file compression/decompression request that was received from the file system program 3004. For example, if the compression management program 3005 receives a file compression request, the compression decision processing unit 6004 decides whether to execute file compression by using the compression management data 3008. If the file is to be compressed, the compression decision processing unit 6004 sends a compression request to the compression/decompression program 3006.

The management processing unit 6005 is a module for processing a management request that is received from the management program 5003 of the management terminal 1005.

The cluster split processing unit 6006 is a module for processing a cluster split request that was received from the file system program 3004. Processing of the compression management program 3005 will be described later in detail.

Figure 7:
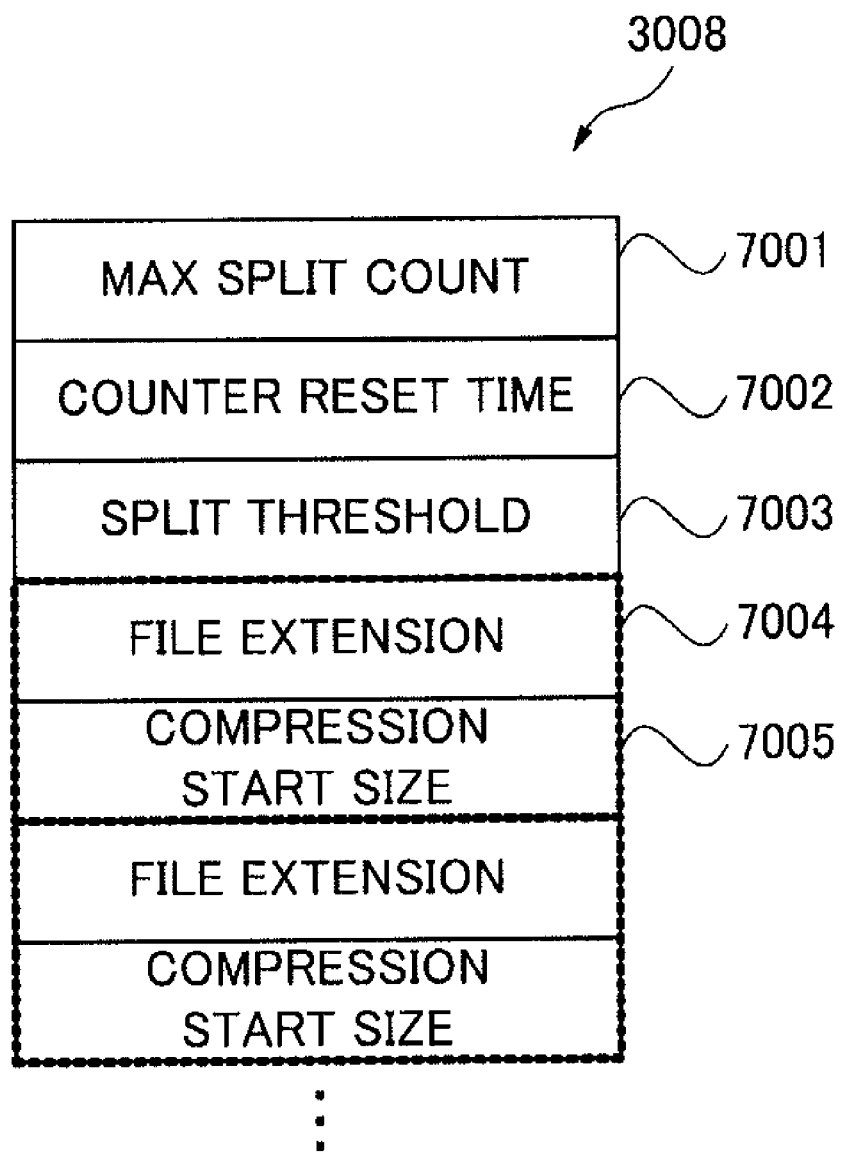
FIG. 7 is a configuration diagram showing an example of compression management data.

FIG. 7 is a block configuration diagram showing the data structure of the compression management data 3008 of the file server 1003.

In FIG. 7, the compression management data 3008 is configured from a maximum split count 7001, an access counter reset time 7002, a split threshold 7003, a file extension 7004, and a compression start size threshold 7005.

The maximum split count 7001 stores, as a limiting value, a numerical value which is the maximum value upon splitting a data area of a file into a plurality of partial areas (hereinafter sometimes referred to as "clusters"). The access counter reset time 7002 is a time for resetting the value of counter. When a time from last access to a file exceeds the access counter reset time 7002, the access counter is set to zero.

The split threshold 7003 is a value of threshold that indicates access count, when the file is divided into a plurality of partial areas. The file extension 7004 stores, for example, as an extension for specifying the file, information of the extension for specifying the respective partial areas. The compression start size threshold 7005 stores a threshold to be used upon deciding whether to compress the file data.

Moreover, the file extension 7004 and the compression start size threshold 7005 are managed as a pair. For example, with respect to the foregoing information; the start size threshold is managed as 10 KB in relation to the extension EXE of the executable file. Furthermore, a plurality of pieces of the foregoing information may be set. For example, an office document file DOC may be added as 5 KB by adding it to the split threshold 7003. Processing using the compression management data 3008 will be described later in detail.

Figure 8:
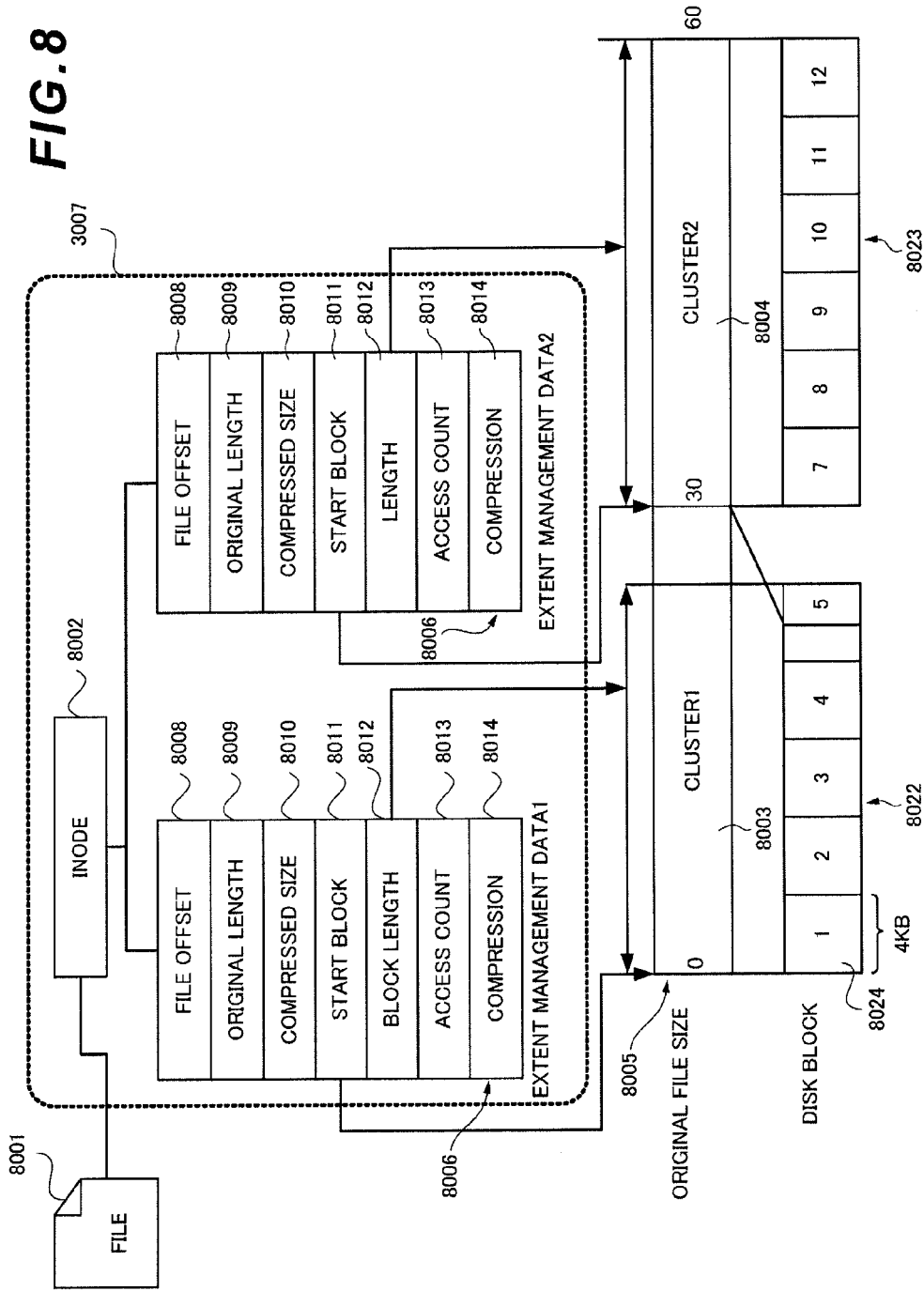
FIG. 8 is a configuration diagram showing an example of file management data.

FIG. 8 is a block diagram showing the relation of the file 8001 stored in the file server 1003, and the file management data 3007 and the data of the file 8001 on the disk.

In FIG. 8, the file 8001 is managed by the file management data 3007 that includes an INODE 8002 corresponding to the file 8001. Here, if the area of the file 8001 is split into two partial areas (hereinafter sometimes referred to as "cluster"), the file 8001 will be configured from two clusters 8003, 8004.

The clusters 8003, 8004 are portions that are obtained by splitting, into two, the original file size 8005 before compressing the file 8001. However, a single file may be configured from a single cluster. In this embodiment, the file 8001 is configured from two clusters; namely, the cluster 8003 and the cluster 8004.

When the file system program 3004 creates the file 8001 on the disk 4005, it creates the INODE 8002 corresponding to the file 8001 on the disk 4005.

When the area of the file 8001 is split into two clusters 8003, 8004, the INODE 8002 respectively is set with permission information to be used in access management, file access time, file size, and extent management data 8006 showing information regarding the disk block storing the data of the file 8001 in correspondence with the clusters 8003, 8004.

The extent management data 8006 for the cluster 8003 is of a data structure for managing the cluster 8003, and is configured from a file offset 8008, an original file data length 8009, a compressed data size 8010, a start data block 8011, a block length 8012, an access count 8013, and a compression flag 8014.

The extent management data 8006 for the cluster 8004 is of a data structure for managing the cluster 8004, and is configured from a file offset 8008, an original file data length 8009, a compressed data size 8010, a start data block 8011, a block length 8012, an access count 8013, and a compression flag 8014.

Each extent management data 8006 is configured as disk block information, and each extent management data 8006 stores information concerning the disk blocks 8022, 8023 corresponding to the clusters 8003, 8004.

For example, if the size of the cluster 8003 before compression is 30 KB, the disk block 8022 is composed of five blocks (blocks #1 to #5) 8024, and the size of the respective blocks 8024 is 4 KB, and data of the cluster 8003 is stored as compressed data (data that has been compressed) in one of the blocks 8024, "0" as the file location; that is, the location of the cluster 8003, is stored in the file offset 8008.

"30 KB" as the original data length of the cluster 8003 is stored in the original file data length 8009, and the size after the data of the cluster 8003 has been compressed is stored in the compressed data size 8010. "1" as the numerical value indicating the #1 block 8024 as the first block is stored in the start data block 8011. "5" is stored as the number of blocks 8024 #1 to #5 in the block length 8012. The numerical value of the access count of the cluster 8003 (count value of the access counter) is stored in the access count 8013. If data of the cluster 8003 is stored as compressed data (data that has been compressed) in one of the blocks 8024, "1" is stored in the compression flag 8014.

Moreover, if the size of the cluster 8004 before compression is 30 to 60 KB, the disk block 8023 is configured from six blocks (blocks #7 to #12) 8024, and the size of the respective blocks 8024 is 4 KB, and data of the cluster 8004 is stored as uncompressed data (decompressed data) in one of the blocks 8024, "30" as the file location; that is, the location of the cluster 8004, is stored in the file offset 8008.

"30 KB" as the original data length of the cluster 8004 is stored in the original file data length 8009, and the size of data (uncompressed data) of the cluster 8004 is stored in the compressed data size 8010. "7" as the numerical value showing the #7 block 8024 as the first block is stored in the start data block 8011. "6" as the number of blocks 8024 #7 to #12 is stored in the block length 8011. The numerical value of the access count of the cluster 8004 (count value of the access counter) is stored in the access count 8013. If data of the cluster 8004 is stored as uncompressed data (decompressed data) in one of the blocks 8024, "0" is stored in the compression flag 8014.

The file management data 3007 and the data recording method upon the file system program 3004 writing data into the disk storage 1004 are now explained.

If the file 8001 to be written does not exist in the disk storage 1004, the file system program 3004 creates the INODE 8002 in the file management data 3007 of FIG. 8 and sets information such as the permission in the INODE 8002. At this point in time, the extent management data 8009 is not created. In other words, the disk blocks 8022, 8023 for storing data are not allocated.

Subsequently, if the file system program 3004 is to store data based on a file access request, it compresses the data of the file 8001 and thereafter stores this, for example, in the disk block 8022, and creates the extent management data 8006. Here, the file system program 3004 sets "0" as the location of the file in the original file size 8005 to the file offset 8008.

Subsequently, the file system program 3004 sets the length of that data; for example, "30 KB" in the original file data length 8009. Moreover, if the data had been compressed, the file system program 3004 sets, for example, the size of the data of the cluster 8003 after compression in the compressed data size 8010. In addition, the file system program 3004 sets the start data block number "1" in the start data block 8011, records the number of blocks to be used for retaining the data in the block length 8012, sets the access count 8013 to 0, and sets the compression flag 8014 to "1".

Meanwhile, if the file 8001 to be written exists in the disk storage 1004, the file system program 3004 uses the file management data 3007 and accesses the file 8001.

For example, if the file server program 3003 sends a file access request to the file system program 3004, the file system program 3004 acquires the INODE 8002 of the file 8001 from the disk storage 1004. Subsequently, the file system program 3004 acquires the extent management data 8006 based on the INODE 8002, specifies the disk block; for example, the disk block 8022 to which data has been recorded based on the acquired extent management data 8006, and reads data from the specified disk block 8022.

Thereafter, the compression management program 3005 uses the compression/decompression program 3006 and decompresses that data. Finally, the file system program 3004 returns the decompressed data that was decompressed to the file server program 3003. The detailed processing during the file access will be described later.

Figure 9:
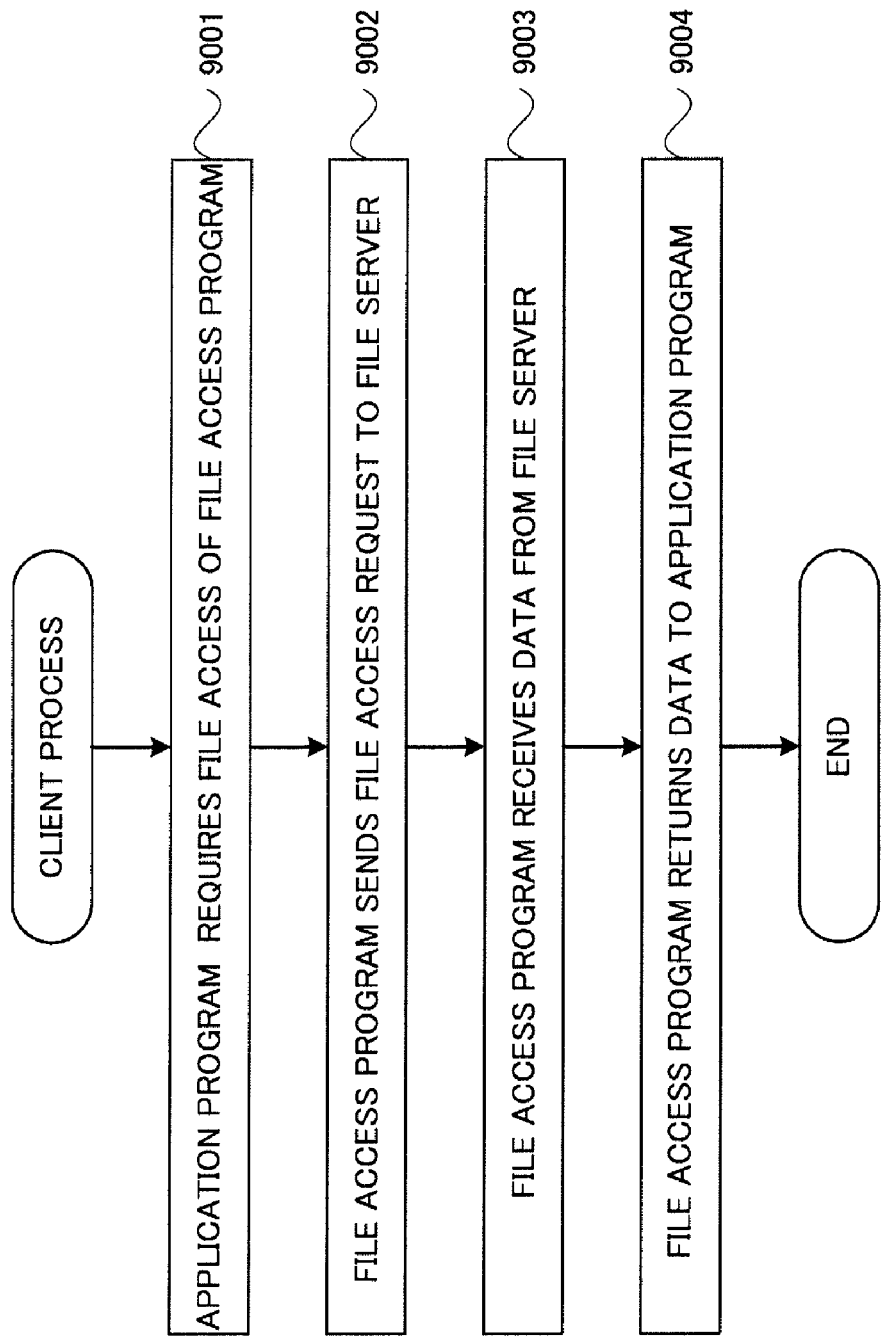
FIG. 9 is a flowchart showing an operational example of the client.

FIG. 9 is a flowchart showing the processing of the client 1001.

The application program 2003 of the client 1001 sends a file access request to the file access program 2004 in order to access the file 8001 (step 9001).

Subsequently, the file access program 2004 sends the file access request to the file server 1003 (step 9002). The file access request includes a file path, a file access location, and a request size.

The file access program 2004 receives the file access result from the file server 1003 (step 9003).

Finally, the file access program 2004 returns the file access result that was received from the file server 1003 to the application program 2003 (step 9004).

Based on the foregoing processing, the client 1001 is able to access the file 8001 stored in the file server 1003.

Figure 10:
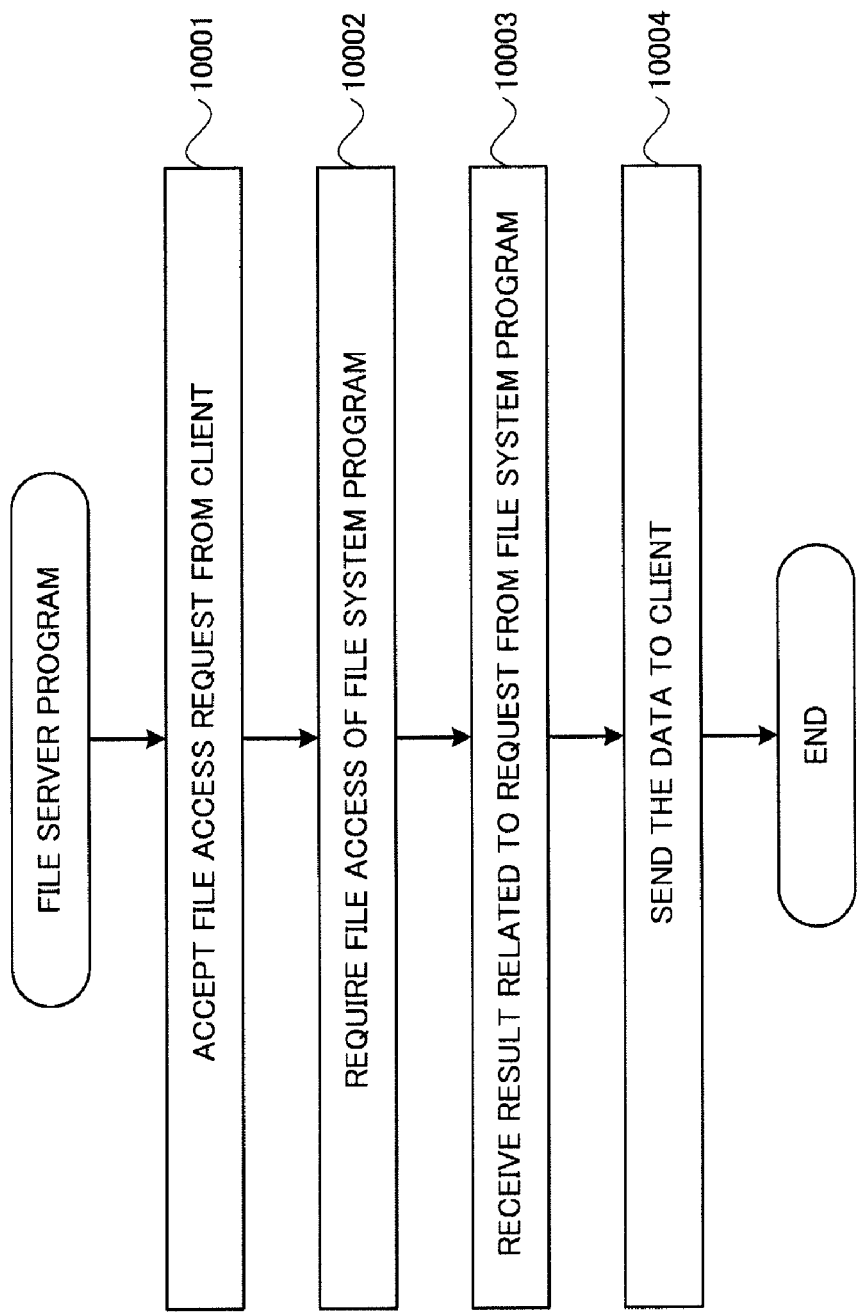
FIG. 10 is a flowchart showing an operational example of the file server program.

FIG. 10 is a flowchart showing the processing of the file server program 3003 of the file server 1003.

The file server program 3003 receives a file access request from the file access program 2004 of the client 1001 (step 10001).

The file server program 3003 that received the file access request sends a file access request to the file system program 3004 (step 10002). A file access request is, for example, a file read request (READ) or a file write request (WRITE). A file access request includes the file name, ID of the processing that is requested (type of processing to be requested), and so on.

The file server program 3003 receives a file access result from the file system program 3004 (step 10003). A file access result is, for example, the contents of the file.

Finally, the file server program 3003 returns the file access result that was received at step 10003 to the file access program 2004 of the client 1001, and thereby ends the processing (step 10004).

Figure 11:
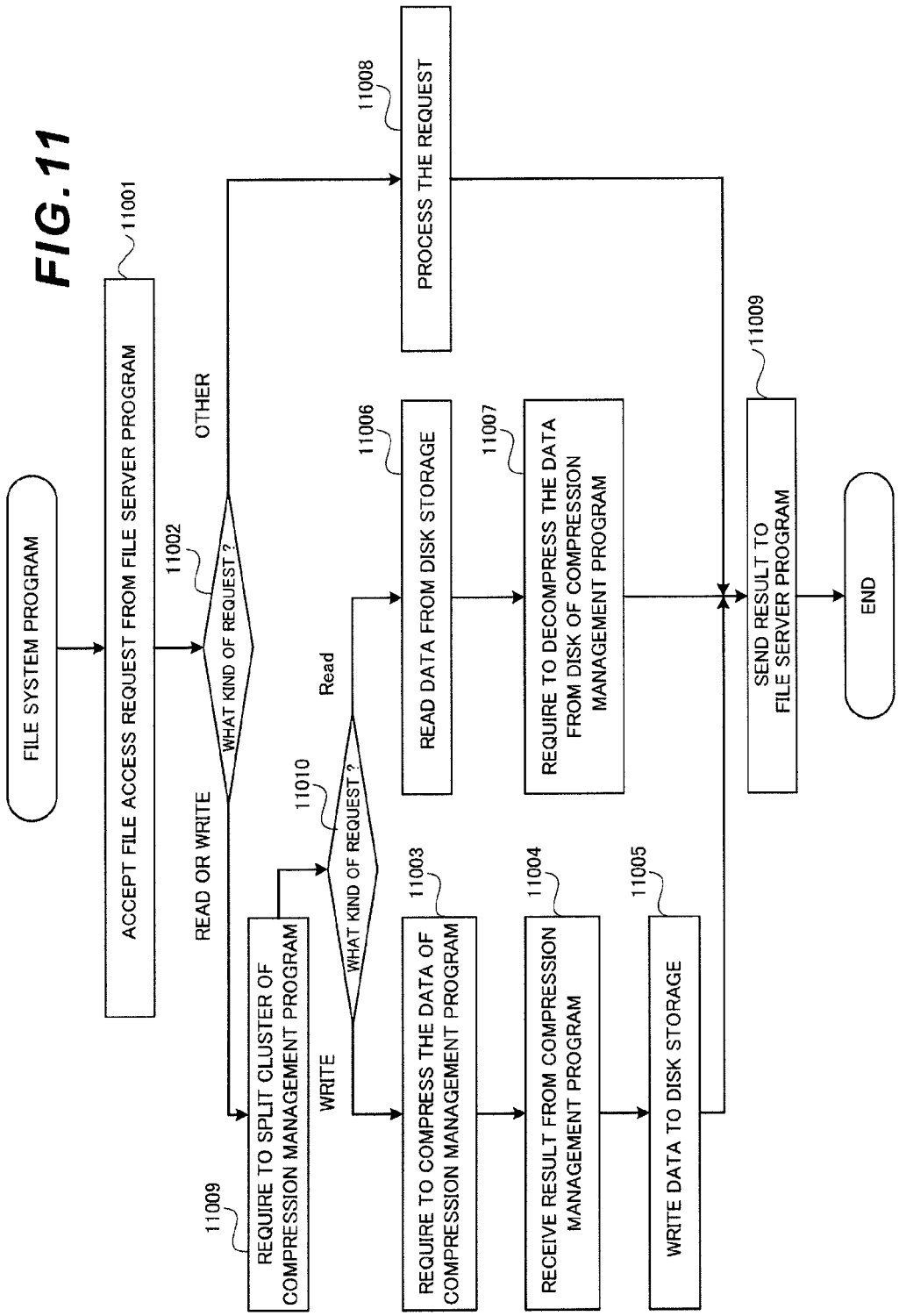
FIG. 11 is a flowchart showing an operational example of the file system program.

FIG. 11 is a flowchart showing the processing of the file system program 3004 of the file server 1003.

The file system program 3004 receives a file access request from the file server program 3003 (step 11001).

The file system program 3004 determines the type of processing based on the information added to the file access request (step 11002).

If the type of processing is not a read request or a write request (step 11002: other), the file system program 3004 executes standard processing to be performed by the file system at step 11008. For example, if the type of processing is the setting of the file access permission, it sets the file access permission to the access target file.

Meanwhile, if the type of processing is a read request or a write request (step 11002: Read or Write), the file system program 3004 executes the processing of step 11009 onward.

The file system program 3004 sends a cluster split processing request to the compression management program 3005 (step 1009). Here, the file system program 3004 uses information regarding the file access location and the access size included in the file access request and specifies the access target cluster, for example, the cluster 8003, and delivers the extent management data 8006 concerning that cluster 8003 to the compression management program 3005.

The compression management program 3005 splits the file 8001 or the cluster 8003 as needed. The cluster split processing of the compression management program 3005 will be described later.

Subsequently, the file system program 3004 determines whether the type of processing is a write request or a read request (step 11010), and, if it is a write request (step 1101: Write), executes the processing of step 11003 onward.

In order to compress the write data that was received from the file server program 3003, the file system program 3004 sends a compression request to the compression management program 3005 (step 11003). Here, the compression management program 3005 compresses the data as needed. The compression processing of the compression management program 3005 will be described later.

The file system program 3004 thereafter receives the compressed data from the compression management program 3005 (step 11004), and writes the compressed data into the disk storage 1004 as the data that has been compressed (step 11005).

Meanwhile, if the type of processing is read (step 1101: Read), the file system program 3004 reads the file data from the disk storage 1004 (step 11006), Subsequently, the file system program 3004 sends the read data to the compression management program 3005, and requests decompression processing (step 11007). Here, the compression management program 3005 compresses the data that was read from the disk storage 1004.

Finally, the file system program 3004 sends the processing result to the file server program 3003, and thereby ends the processing (step 11009).

Figure 12:
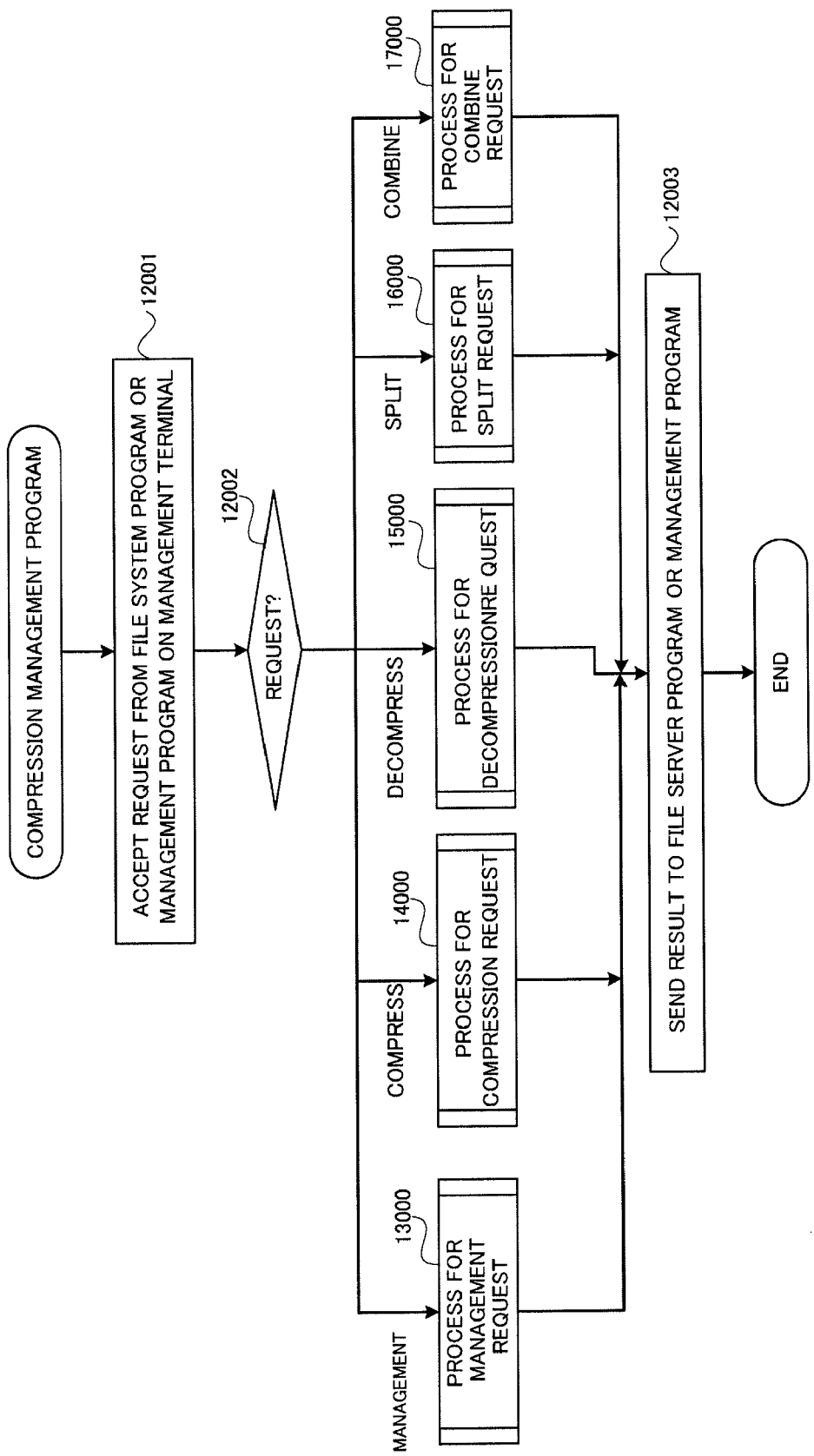
FIG. 12 is a flowchart showing an operational example of the compression management program.

FIG. 12 is a flowchart showing the processing of the compression management program 3005.

The compression management program 3005 receives a request from the file system program 3004, or the management program 5003 of the management terminal 1005 (step 12001).

Subsequently, the compression management program 3005 determines the contents of the received request (step 12002), and, in accordance with the determination result, executes one of the processing steps among step 13000, step 14000, step 15000, step 16000, and step 17000. Details regarding the respective processing steps will be described later.

Finally, the compression management program 3005 returns the processing result to the file system program 3004, or the management program 5003 of the management terminal 1005, and thereby ends the processing (step 12003).

Figure 13:
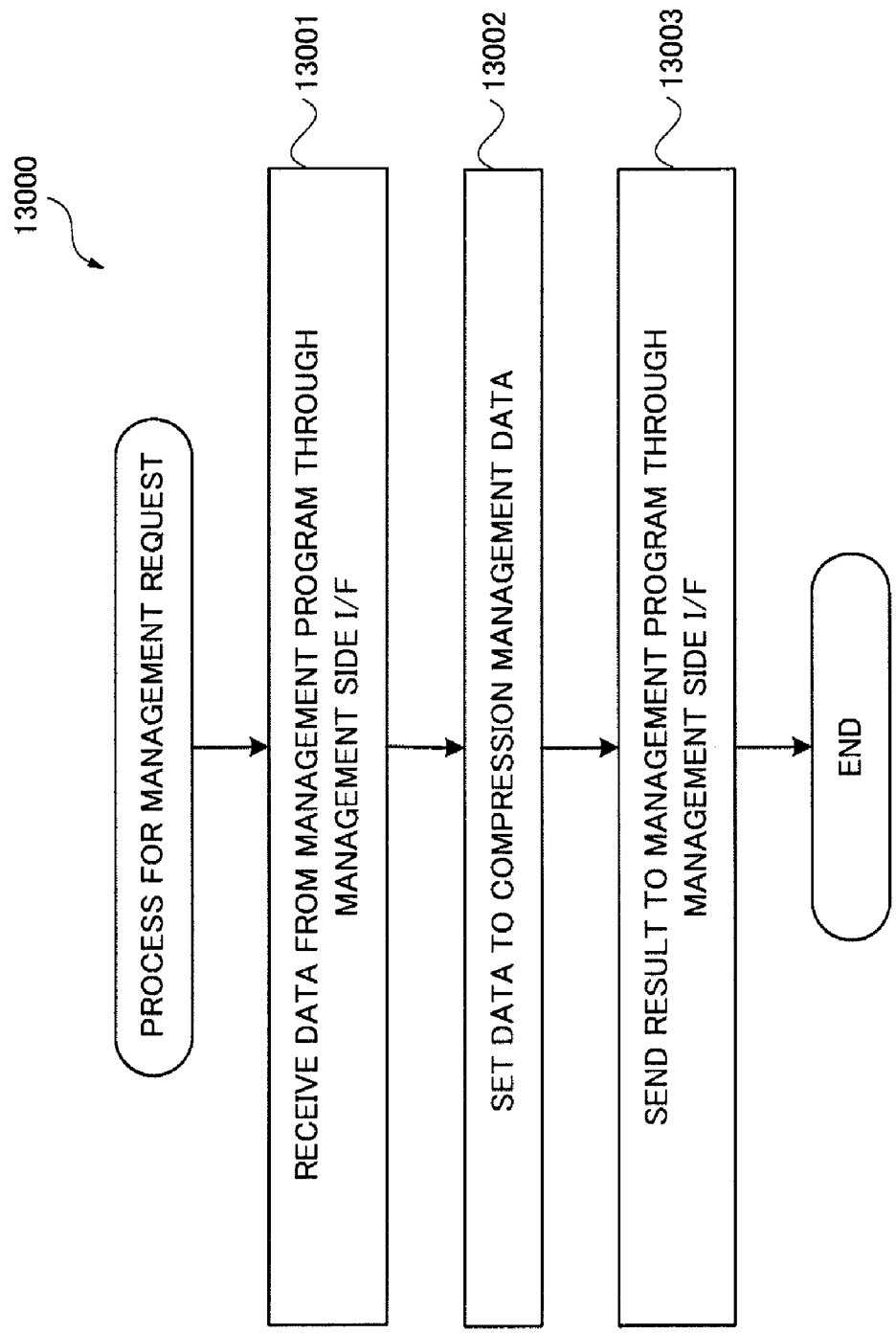
FIG. 13 is a flowchart showing an operational example of the compression management program in response to a management request.

FIG. 13 is a flowchart showing the management request processing of the compression management program 3005.

This processing is requested through the management side interface 6003 of the compression management program 3005, and executed by the management processing unit 6005 of the compression management program 3005.

The management processing unit 6005 receives data to be set in the compression management data 3008 from the management program 5003 of the management terminal 1005 (step 13001).

The management processing unit 6005 sets the received data in the compression management data 3008 (step 13002).

Finally, the management processing unit 6005 notifies the completion of setting to the management program 3005, and thereby ends the processing (step 13003).

Figure 14:
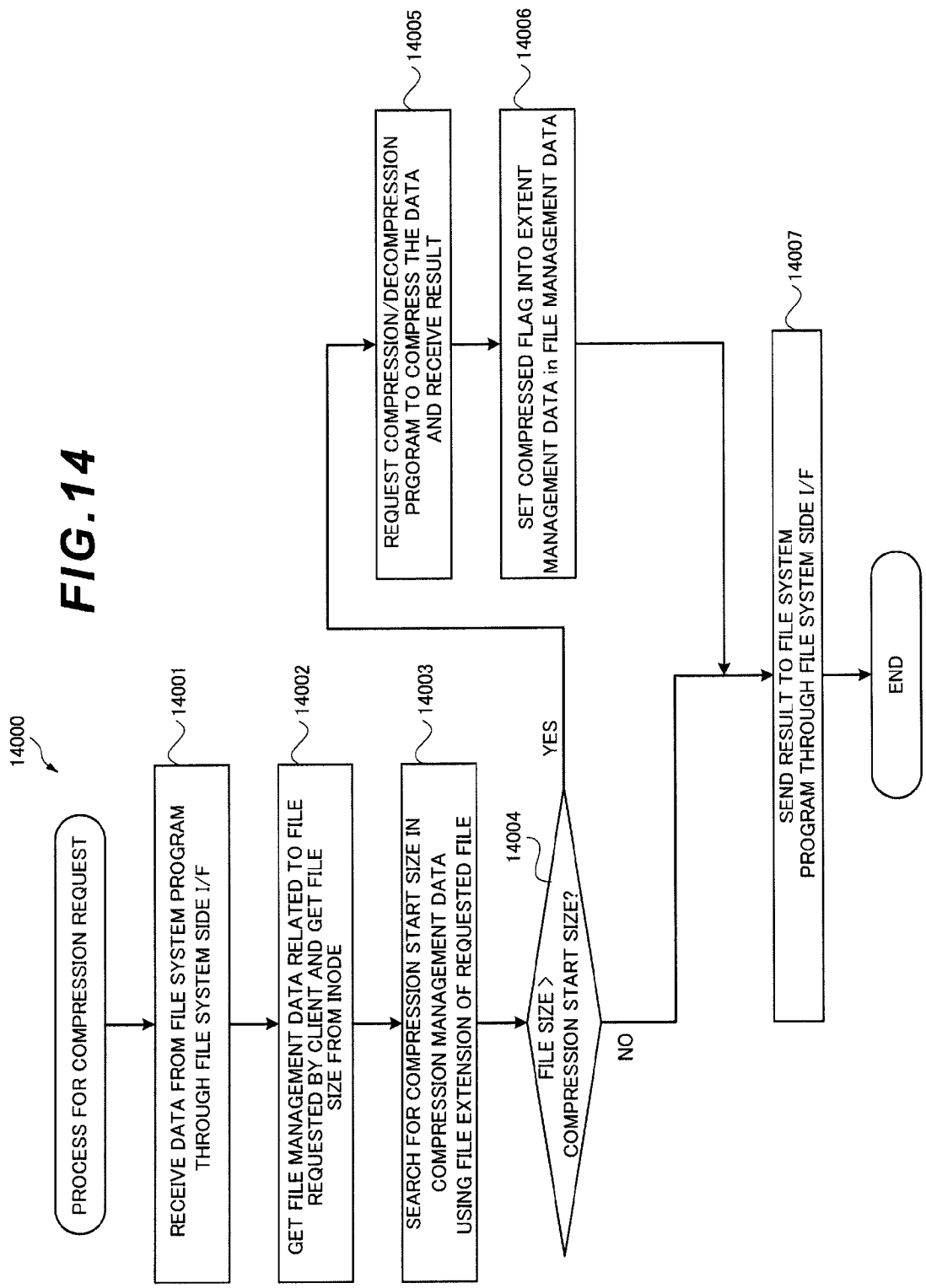
FIG. 14 is a flowchart showing an operational example of the compression management program in response to a compression request.

FIG. 14 is a flowchart showing the compression request processing of the compression management program 3005.

This processing is requested through the file system side interface 6001 of the compression management program 3005, and executed by the compression decision processing unit 6004.

The compression decision processing unit 6004 receives the data to be compressed from the file system program 3004 (step 14001).

Subsequently, the compression decision processing unit 6004 acquires the file management data 3007 concerning the data to be compressed, and acquires the file size that is recorded in the INODE 8002 of the file management data 3007 (step 14002).

Subsequently, the compression decision processing unit 6004 searches for the extension of the file 8001 to be accessed from the file extension 7004 of the compression management data 3008 (step 14003). Here, the compression decision processing unit 6004 acquires, from the compression management data 3008, the compression start size threshold 7005 corresponding to the extension that coincides with the searched file extension 7004.

The compression decision processing unit 6004 thereafter compares the acquired file size and the compression start size threshold 7005 (step 14004). If the acquired file size is smaller than the compression start size threshold 7005 (step 14004: NO), the compression decision processing unit 6004 returns the processing result to the file system program 3004 without compressing the data, and thereby ends the processing (step 14007).

Meanwhile, if the acquired file size is greater than the compression start size threshold 7005 and the determination at step 14004 is YES, the compression decision processing unit 6004 specifies the extent management data; for example, the extent management data 8006, for managing the data to be compressed based on the file access location. Subsequently, in order to compress the data, the compression decision processing unit 6004 sends a data compression request to the compression/decompression program 3006 (step 14005).

The compression decision processing unit 6004 sets "1" as a flag showing that the data has been compressed in the compression flag 8014 of the extent management data 8006 (step 14006).

Finally, the compression decision processing unit 6004 returns the compressed data to the file system program 3004, and thereby ends the processing (step 14007).

Figure 15:
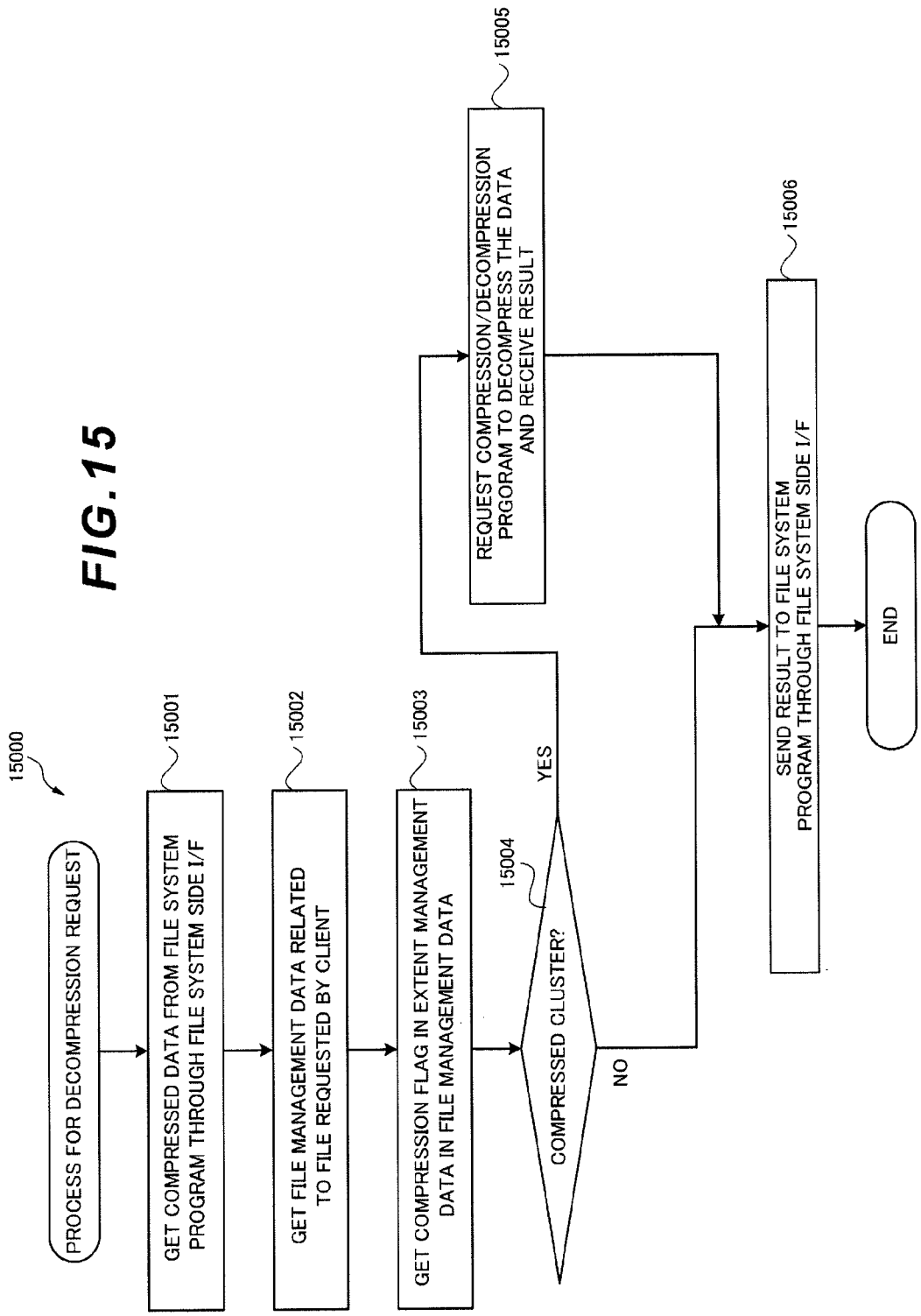
FIG. 15 is a flowchart showing an operational example of the compression management program in response to a decompression request.

FIG. 15 is a flowchart showing the decompression request processing of the compression management program 3005.

This processing is requested through the file system side interface 6001 of the compression management program 3005, and executed by the compression decision processing unit 6004.

The compression decision processing unit 6004 receives compressed data from the file system program 3004 (step 15001). The compression decision processing unit 6004 acquires the file management data 3007 concerning the received compressed data (step 15002). Here, the compression decision processing unit 6004 specifies the extent management data 8006 of the cluster 8003, for example as the extent management data based on the file access location.

Subsequently, the compression decision processing unit 6004 acquires the compression flag 8014 of the file management data 3007 (step 15003), and determines whether the data of the cluster 8003 has been compressed (step 15004). If the data of the cluster 8003 has not been compressed (step 15004: NO), the compression decision processing unit 6004 returns the processing result to the file system program 3005 without performing the decompression processing to the cluster 8003 (step 15006).

Meanwhile, if the data of the cluster 8003 has been compressed (step 15004: YES), the compression decision processing unit 6004 sends a data decompression request to the compression/decompression program 3006 (step 15005).

Finally, the compression decision processing unit 6004 returns the decompressed data to the file system program 3004, and thereby ends the processing (step 15006).

Figure 16:
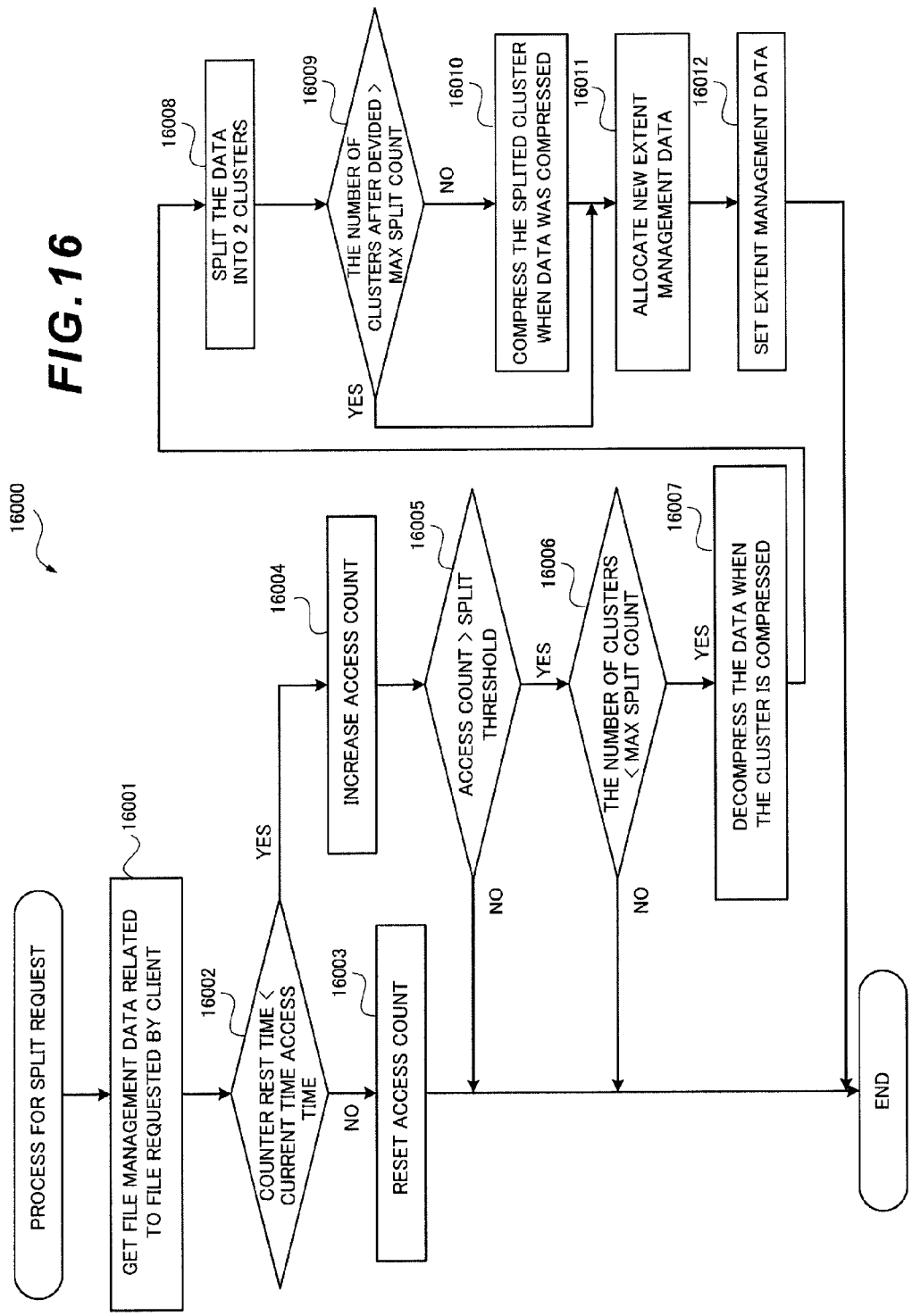
FIG. 16 is a flowchart showing an operational example of the compression management program in response to a cluster split request.

FIG. 16 is a flowchart showing the cluster split request processing of the compression management program 3005.

This processing is requested through the file system side interface 6001 of the compression management program 3005, and executed by the cluster split processing unit 6006.

The cluster split processing unit 6006 receives a request from the file system program 3004, and acquires the file management data 3007 of the cluster split target file (step 16001). Here, the cluster split processing unit 6006 acquires the extent management data from the file access location. Here, if the file 8001 has not yet been split into the clusters 8003, 8004, the extent management data 8006 concerning the file 8001 is acquired, and if the file 8001 has been split into the clusters 8003, 8004, for example, the extent management data 8006 of the cluster 8003 is acquired.

Subsequently, the cluster split processing unit 6006 obtains the difference time of the time (current time) set in the file server 1003 and the access time that is recorded in the INODE 8002 of the file management data 3007. Then, the cluster split processing unit 6006 compares the access count reset time 7002 of the compression management data 3008 and the difference time (step 16002).

If the access count reset time 7002 is greater than the difference time (step 16002: NO), the cluster split processing unit 6006 deems that the elapsed time from the access time has exceeded the access count reset time 7002, sets the access count 8013 of the extent management data 8006 to 0, and thereby ends the processing (step 16003). In other words, in the foregoing case, the cluster split processing unit 6006 does not split the file 8001 or the cluster 8003.

Meanwhile, if the access count reset time 7002 is smaller than the difference time (step 16002: YES), the cluster split processing unit 6006 adds one to the access count 8013 of the extent management data 8006 (step 16004).

The cluster split processing unit 6006 thereafter compares the access count 8013 and the split threshold 7003 (step 16005).

If the value (access count) of the access counter 8007 is smaller than the split threshold 7003 (step 16005: NO), the cluster split processing unit 6006 ends the cluster split processing.

Meanwhile, if the value (access count) of the access counter 8007 is greater than the split threshold 7003 (step 16005: YES), the cluster split processing unit 6006 compares the number of clusters of the file 8001 and the maximum split count 7001 (step 16006).

If the number of clusters of the file 8001 is smaller than the maximum split count 7001 (step 16006: NO), the cluster split processing unit 6006 ends the cluster split processing.

Meanwhile, if the number of clusters of the file 8001 is greater than the maximum split count 7001 (step 16006: YES), the cluster split processing unit 6006 executes the processing of step 16007 onward.

The cluster split processing unit 6006 acquires data of the processing target file 8001 or data of the clusters 8003, 8004 from the disk storage 1004. If the acquired data of the processing target file 8001 or data of the clusters 8003, 8004 has been compressed, the cluster split processing unit 6006 uses the compression/decompression program 3006 and decompresses such data (step 16007).

If the cluster split processing unit 6006 thereafter splits the processing target file 8001 into the clusters 8003, 8004, for example, it splits the data after decompression into two (step 16008).

Subsequently, the cluster split processing unit 6006 determines whether the number of clusters after the split is greater than the split threshold 7003 (step 16009).

If the number of clusters after the split is greater than the split threshold 7003 (step 16009: YES), since the data of the split clusters will not be compressed, the cluster split processing unit 6006 proceeds to step 16010. Meanwhile, if the number of clusters after the split is smaller than the split threshold 7003 (step 16009: NO), the cluster split processing unit 6006 proceeds to step 16010.

If data is decompressed at step 16007, the cluster split processing unit 6006 uses the compression/decompression program 3006 and compresses the split data (step 16010).

The cluster split processing unit 6006 thereafter creates new extent management data 8006 (step 16011), and sets the new extent management data 8006 in the file management data 3007 (step 16012).

Upon executing the foregoing cluster split processing, each time the file 8001 or the clusters 8003, 8004 are accessed, the access count is counted with the access counter and recorded, and the file 8001 or the clusters 8003, 8004 are split on the condition that the access count exceeds the number of accesses in the access counter reset time set by the administrator and the split threshold 7003 set by the administrator. It is thereby possible to prevent the file 8001 or the clusters 8003, 8004 from being excessively split.

Figure 17:
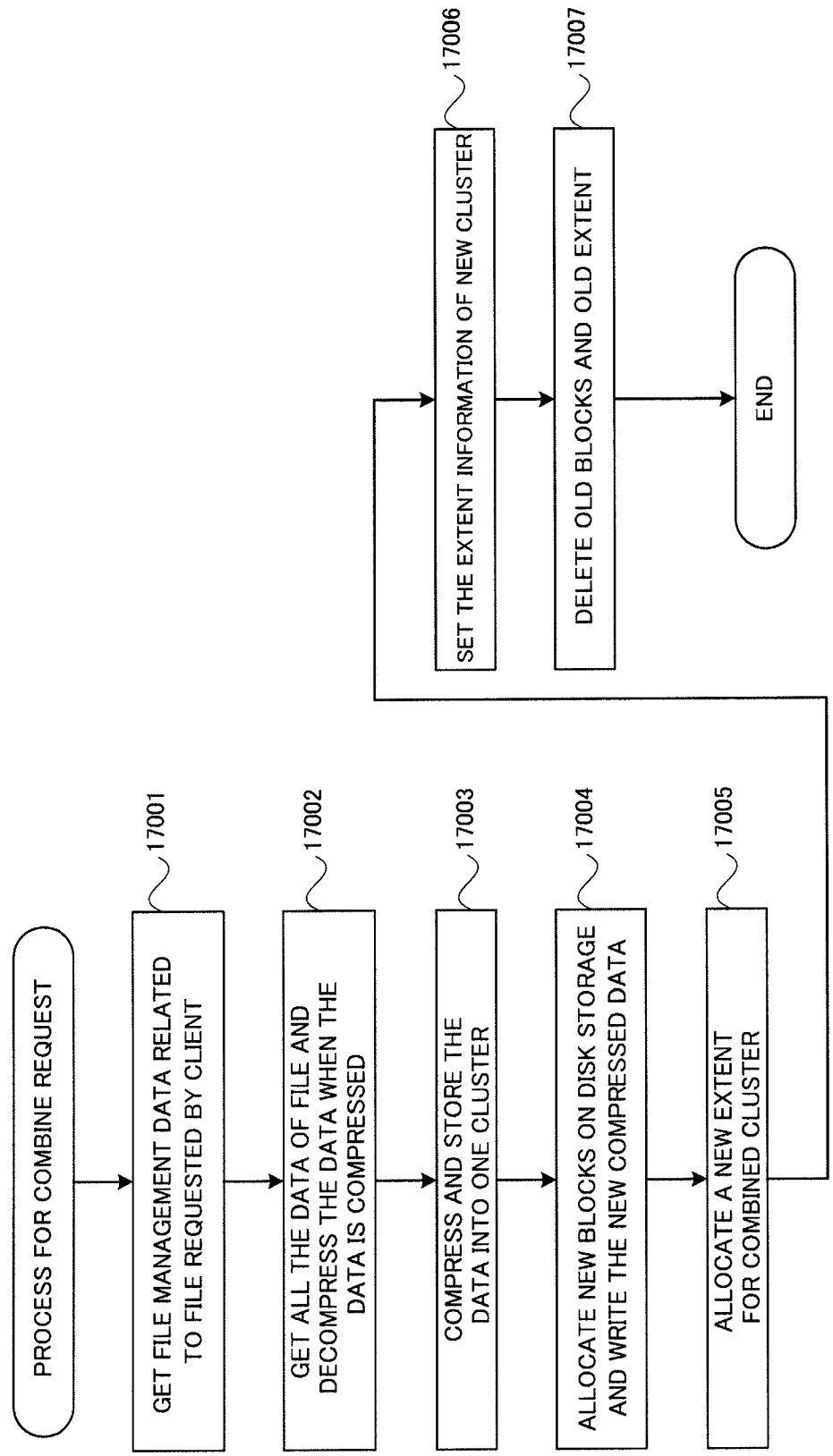
FIG. 17 is a flowchart showing an operational example of the compression management program in response to a cluster combine request.

FIG. 17 is a flowchart showing the cluster combine request processing of the compression management program 3005.

This processing is requested through the management side interface 6003 of the compression management program 3005, and executed by the cluster split processing unit 6006.

The cluster split processing unit 6006 receives a cluster combine processing request from the management program 5002, and acquires the file management data 3007 of the processing target file 8001 (step 17001).

Subsequently, if the data of the processing target file 8001, for example, if the file 8001 has been split into a plurality of clusters, the cluster split processing unit 6006 acquires data of the respective clusters from the disk storage 1004. If the acquired data has been compressed, the cluster split processing unit 6006 uses the compression/decompression program 3006 and decompresses the data of the respective clusters (step 17002).

Thereafter, the cluster split processing unit 6006 selects a plurality of clusters in which the access count does not exceed the split threshold 7003 among the clusters obtained by splitting the file 8001, compiles the data of the plurality of selected clusters as data of one new cluster, and compresses the compiled data (step 17003).

Subsequently, in order to store the compressed data, the cluster split processing unit 6006 allocates the new block 8024 to the disk storage 1004, and stores the compressed data in the allocated block 8024 (step 17004).

In order to manage the compressed data in the allocated block 8024, the cluster split processing unit 6006 thereafter creates new extent management data 8006 (step 17006), and sets the information of the new cluster in the new extent management data 8006 (step 17006).

Finally, the cluster split processing unit 6006 deletes the block 8024 storing old data prior to performing the cluster combine processing and the extent management data 8006 (step 17007), and thereby ends the processing of this routine.

Figure 18:
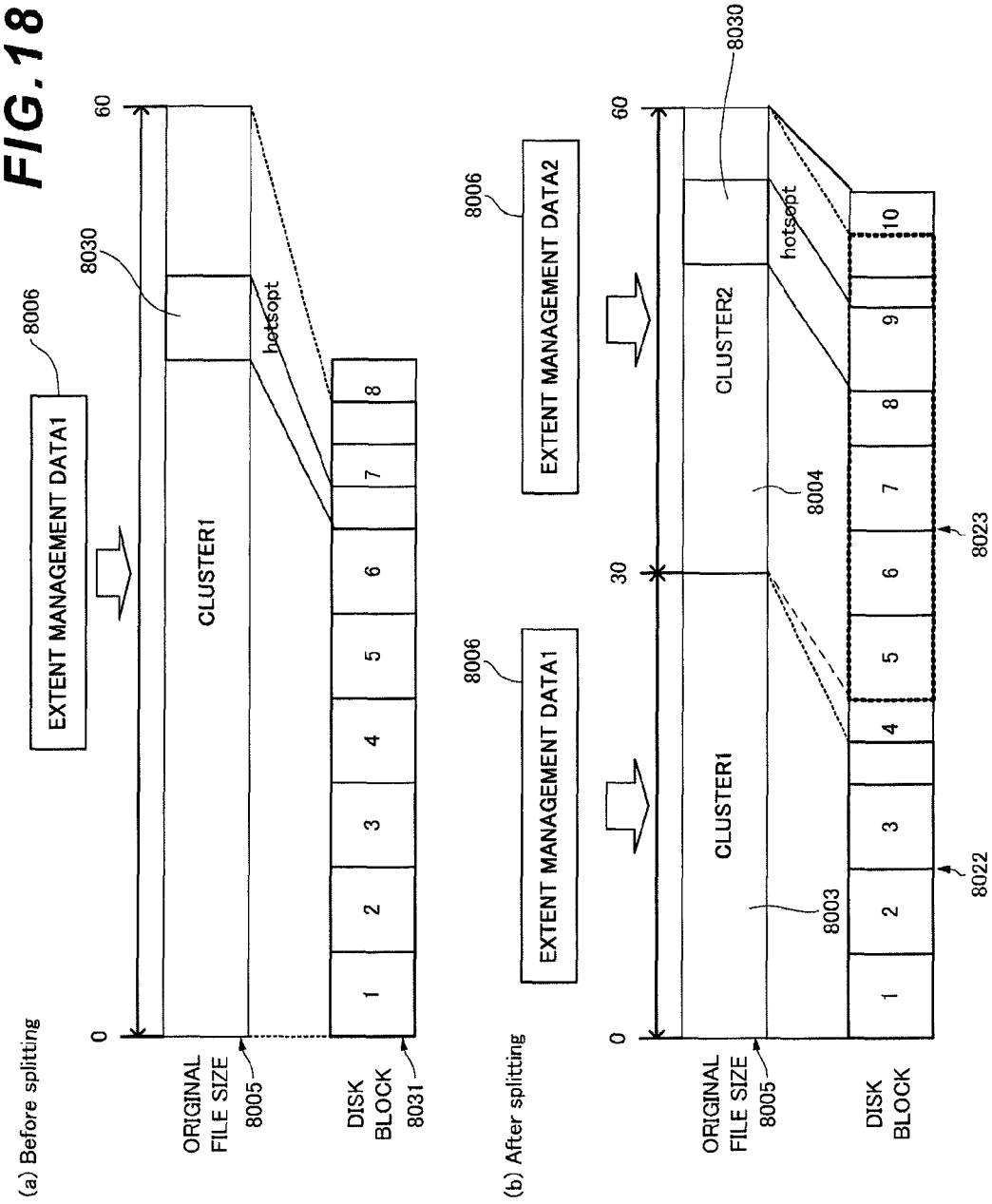
FIG. 18 is a schematic diagram showing an operational example of the cluster split processing.

FIG. 18 is a schematic diagram showing an operational example of the cluster split processing upon splitting a file into two clusters.

(Before Splitting)

Before splitting the file 8001 into the two clusters 8003, 8004, as shown in FIG. 18(a), the area of the file 8001 is configured as a single area. In other words, the file 8001 is set with one extent management data 8006.

Here, if the end user frequently access a portion of the area of the file 8001 from the client 1001, the access count is counted with the access counter, the countable number of values is recorded, and a hotspot 8030 that is accessed frequently is formed in a part of the area of the file 8001.

If the value of the access count of the extent management data 8006 exceeds the split threshold 7003, the area of the file 8001 is managed as a split target area, and the split target area is split, for example, as shown in FIG. 18(b), into two the clusters 8003, 8004.

(After Splitting)

If the area of the file 8001 is evenly split into the two clusters 8003, 8004, two extent management data (first extent management data and second extent management data) 8006 are set in the file management data 3007 in correspondence with the clusters 8003, 8004.

If the access count is smaller than the split threshold 7003 and a hotspot 8030 does not exist in the cluster 8003, the cluster 8003 is managed as a compression target area. In other words, data corresponding to the cluster 8003 is compressed, and thereafter stored as compressed data in the disk block 8022.

Meanwhile, if the access count is greater than the split threshold 7003 and a hotspot 8030 exists in the cluster 8004, the cluster 8004 is managed as a non-compression target area. In other words, data corresponding to the cluster 8004 is stored as uncompressed data (decompressed data) in the disk block 8023 without being compressed. In the foregoing case, since it is not necessary to decompress the data when reading the data corresponding to the cluster 8004 from the disk block 8023, the load on the decompression processing can be alleviated. Moreover, decompression of data during the update and re-compression processing of data are no longer required.

Moreover, although the time required for decompressing data will become longer according to the size of the compressed data, since the file 8001 is split into the two clusters 8003, 8004 and the data corresponding to the file 8001 is managed by being divided into the clusters 8003, 8004 of a smaller size, the time required for decompressing data will be shorter upon reading the data corresponding to the cluster 8003 from the disk blocks 8022, 8023 in comparison to reading the data corresponding to the file 8001 from the disk block 8031.

Moreover, although a case of evenly splitting the area of the file 8001 into the two clusters 8003, 8004 was explained, the area of the file 8001 can be split into two or more clusters, and the size of the respective cluster may also be different.

Moreover, if the area of the file 8001 is split into two or more clusters, a cluster that is managed as a non-compression target area may be split at least one or more types until a cluster among the plurality of clusters obtained with the split in which the access count exceeds split threshold 7003 is extracted as a minimum size cluster.

For example, if the cluster 8004 is managed as a non-compression target area, the processing of further splitting the cluster 8004, and sequentially splitting the cluster that is managed as the non-compression target area until a cluster among the clusters obtained with the split in which the access count exceeds the split threshold 7003 is extracted as a minimum size cluster.

Consequently, it is possible to minimize the cluster in which the access count exceeds the split threshold (cluster including a hotspot that is accessed frequently), ultimately decompress the data corresponding to that cluster, and compress only the data corresponding to the other clusters (clusters including a coldspot that is accessed infrequently).

Moreover, in the course of repeating the processing of sequentially splitting the cluster that is managed as a non-compression target area, since the cluster that is managed as the compression target area; for example, since the cluster 8003 is created sequentially, if there are a plurality of clusters that are managed as the compression target area, data corresponding to the plurality of clusters that are managed as the compression target area may be read from the disk blocks, respectively, and the read data may be respectively combined and collectively compressed, and the data that was compressed may be stored as compressed data in the disk block.

Consequently, the time required for compressing the data can be shortened by reading data corresponding to a plurality of clusters (clusters including a hotspot that is accessed frequently) in which the access count is smaller than the split threshold from the disk blocks, respectively, and respectively combining and collectively compressing the read data.

Figure 19:
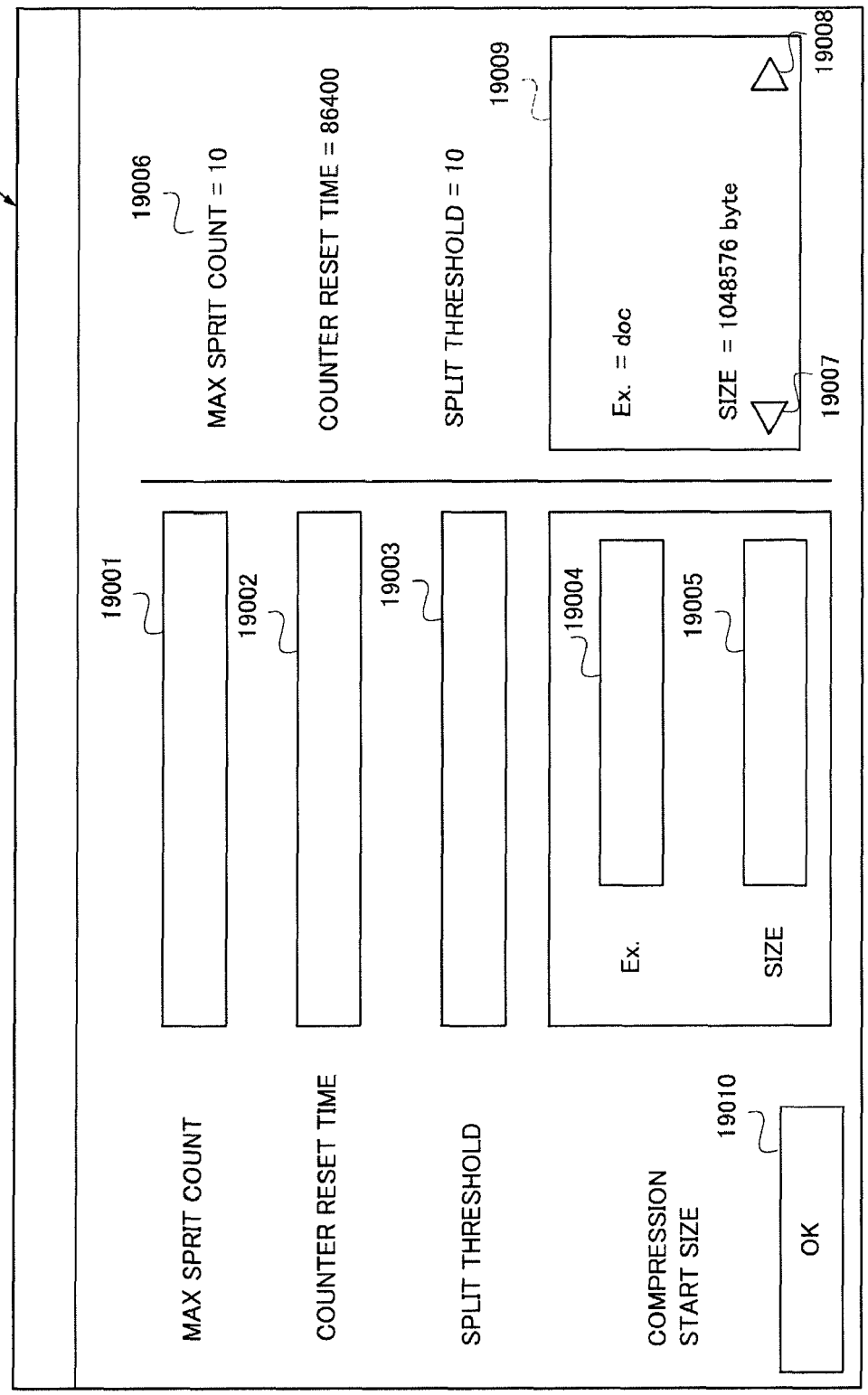
FIG. 19 is a screen configuration diagram showing an example of the interface (GUI) of the management terminal.

FIG. 19 is a screen configuration diagram showing a GUI (Graphical User Interface) of the management side interface 5004 of the management terminal 1005.

In FIG. 19, the management side interface 5004 comprises an input box 19001 for inputting the maximum split count 7001, an input box 19002 for inputting the access counter reset time 7002, an input box 19003 for inputting the split threshold 7003, input boxes 19004, 19005 for inputting the file extension 7004 and the compression start size 7005 as a set, and a button 19010, and the foregoing information is displayed on the management screen 1900.

The setting processing is started as a result of the administrator pressing the button 19010 after inputting the foregoing information using the input boxes 19001 to 19005.

When the setting processing is started, the currently set information 19006, 19009 is displayed at the right side of the management screen 1900. Here, since a plurality of compression start sizes 7005 can be set, the buttons 19007, 19008 for switching the displayed information is displayed.

Figure 20:
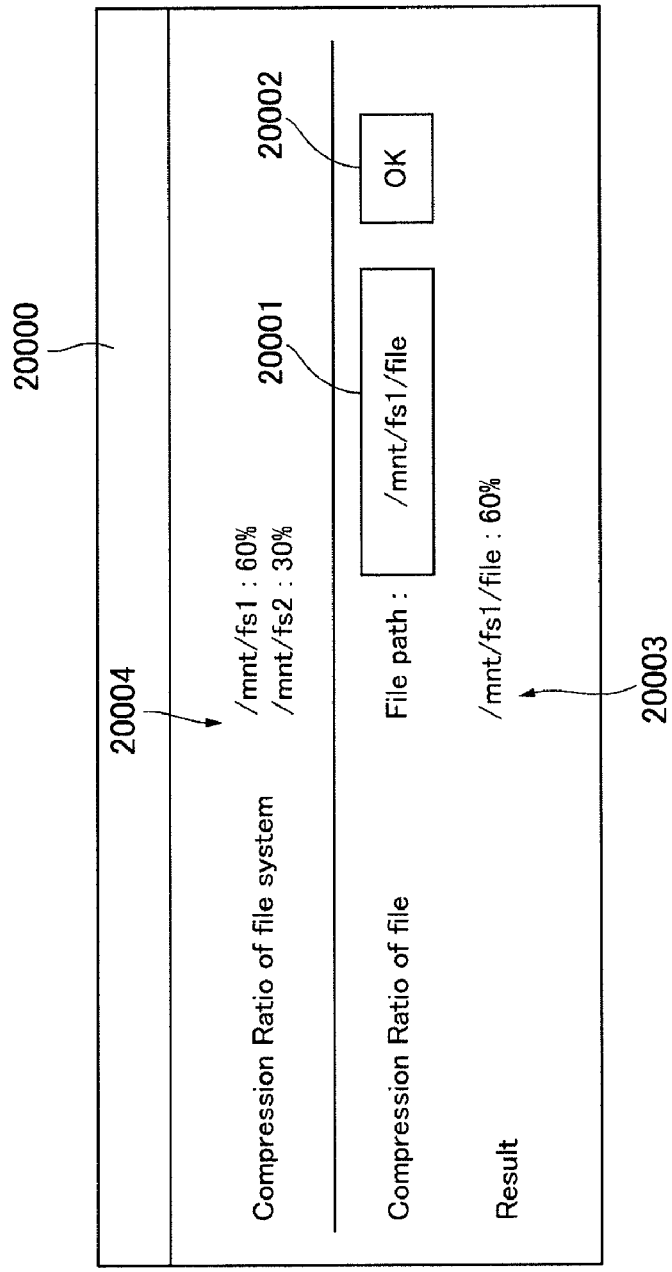
FIG. 20 is a screen configuration diagram showing another example of the interface (GUI) of the management terminal.

FIG. 20 is a screen configuration diagram screen configuration diagram showing the GUI of the management side interface 5004 of the management terminal 1005. FIG. 20 is a screen configuration diagram for displaying, in addition to the GUI of FIG. 1, the current compression ratio of the file system and the compression ratio of the file that was designated by the administrator.

Upon displaying the compression ratio of the file 8001, the administrator inputs the path of the display target file 8001 into the input box 20001, and presses the OK button 20002. The management program 5003 thereby sends a data acquisition request to the compression management program 3005. The compression management program 3005 acquires the compression management data 3008 and the file management data 3007, and transfers them to the management terminal 1005. The management side interface 5004 of the management terminal 1005 displays, on the management screen 20000, information 20003 showing the compression status of the file system based on the transferred information and information 20004 showing the compression ratio for each file.

Based on this GUI, the administrator is able to confirm the compression status of the file system or the compression ratio for each file.

According to this embodiment, it is possible to prevent deterioration in the I/O performance of files including a hotspot in a file system equipped with a file compression function.

Moreover, according to this embodiment, it is possible to suppress the deterioration in the I/O performance of a file even if such file has an area that is accessed frequently.

(Second Embodiment)

The second embodiment improves the file compression ratio by actively performing the cluster combine processing explained with reference to FIG. 17.

Upon compressing the file 8001, generally speaking, the compression ratio will increase if compression is performed in a large unit rather than performing compression in a small unit. Accordingly, the file compression ratio can be improved if the plurality of clusters, which were split in small units, are actively combined.

As the timing of actively combining the plurality of clusters, considered may be the timing that the write flag of the access permission set in the file 8001 is dropped, or the timing in which the file 8001, which is currently being used, is closed.

The case of executing the cluster combine processing when the write flag of the access permission is dropped is foremost explained.

Upon creating the file 8001, the access permission is stored in the INODE 8002. In the case of a system that is compliant with POSIX, the access permission is set with the three types of information of "read," "write" and "execute" in relation to the three groups of "file owner," "file owning group" and "others".

If the write permission of the three groups is not set, no one is allowed to write data into that file. In other words, the file 8001 will not be updated. If the file 8001 cannot be updated, the file compression ratio can be improved by collectively compressing the data corresponding to the file 8001 in a large unit.

In the foregoing case, when all write flags of the access permission are dropped with the setattr request, the file system program 3004 sends a cluster combine request through the management side interface 6003 of the compression management program 3005. Subsequently, the compression management program 3005 performs the cluster combine processing.

In other words, as a result of executing the cluster combine processing of respectively combining the plurality of clusters on the condition that the processing request is a change request for requesting the change of setting of the file 8001, the file compression ratio can be improved.

The case of executing the cluster combine processing when the file is closed is now explained.

Upon using the file 8001, the application program 2003 that is used by the end user performs processing referred to as open processing in order to notify the start of using the file to the file system program 3004.

Meanwhile, in order to notify the end of using the file to the file system program 3004, the application program 2003 performs processing referred to as close processing. In other words, when the application program 2003 performs the close processing, it becomes clear that the file 8001 will not be used.

If the file 8001 is not being used due to the close processing, the file compression ratio can be improved by the file system program 3004 executing the cluster combine processing 17000.

In other words, the file compression ratio can be improved by executing the cluster combine processing of respectively combining the plurality of clusters on the condition that the processing request is an end request for requesting the end of use of the file 8001.

Note that, when the file 8001 is not being used due to the close processing, since the file 8001 is not being used, the access performance to the file 8001 will not deteriorate even if a large cluster is formed.

(Third Embodiment)

This embodiment sends and receives a file and information concerning the file between the client and the server.

Figure 21:
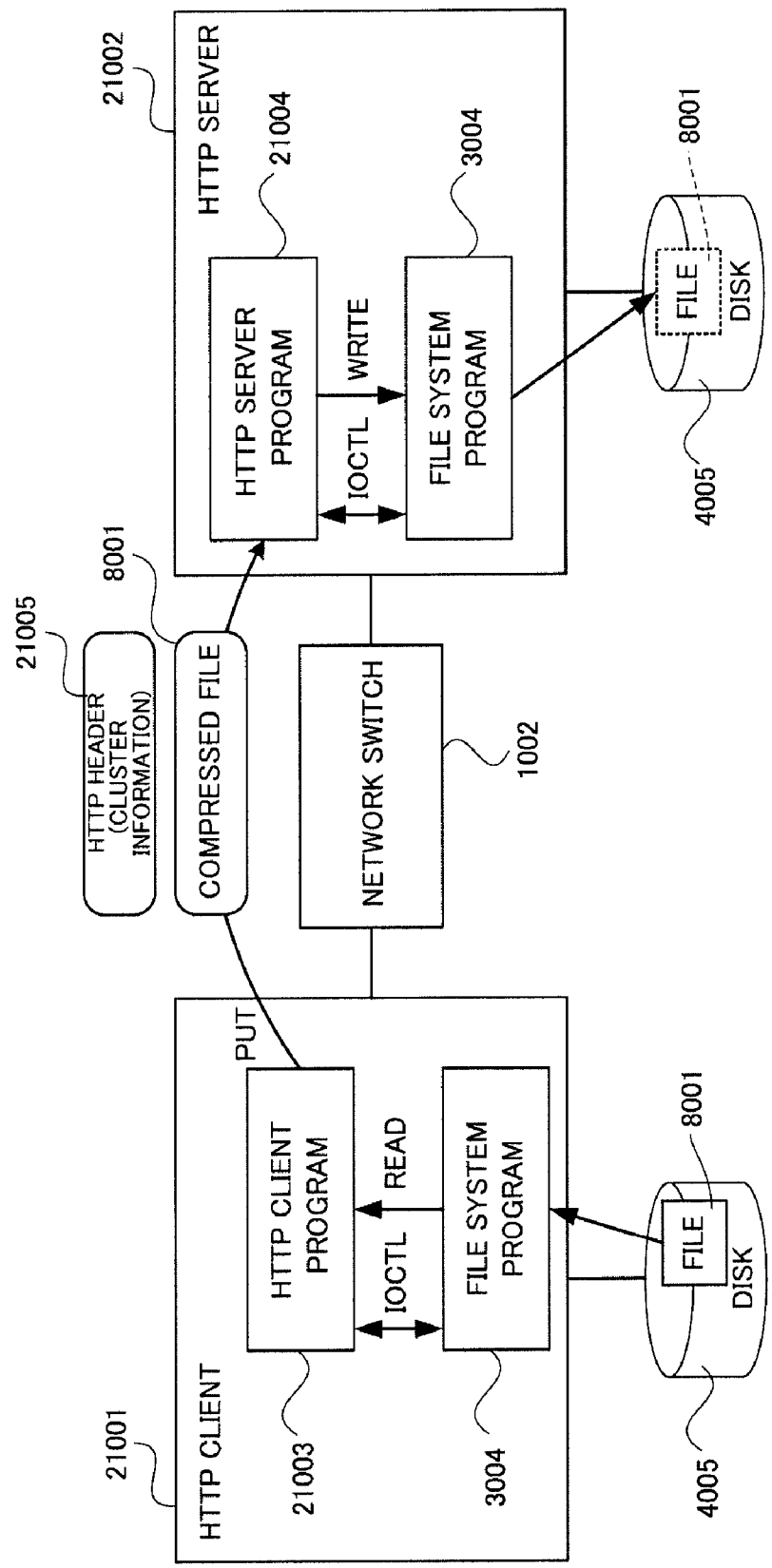
FIG. 21 is a schematic diagram showing a situation of the compressed file being subject to PUT through HTTP.

FIG. 21 is a block configuration diagram of the computer system showing the third embodiment of the present invention. In FIG. 21, the computer system includes an HTTP (Hypertext Transfer Protocol) client 21001, and an HTTP server 21002, and the HTTP client 21001 and the HTTP server 21002 are connected via a network switch 1002.

The HTTP client 21001 includes, as with the client 1001, a CPU 2001 and a memory 2002 (both not shown), and the disk 4005 is connected to the storage interface.

The HTTP server 21002 includes, as with the file server 1003, a CPU 3001 and a memory 3002 (both not shown), and the disk 4005 is connected to the storage interface 3010.

Here, the HTTP client 21001 functions as a first computer, the disk 4005 in the HTTP client 21001 functions as a first storage device, and the CPU 2001 functions as a first controller for controlling the I/O processing of data to and from the disk 4005.

The HTTP server 21002 functions as a second computer, the disk 4005 in the HTTP server 21002 functions as a second storage device, and the CPU 3001 functions as a second controller for controlling the I/O processing of data to and from the disk 4005.

Here, if the CPU 2001 is used as the processing request source of the CPU 3001 and the processing request from the CPU 2001 is a file access request, the CPU 3001, as the second controller, records an access count by associating it with an area of the file, manages the area of the file as a split target area if the recorded access count exceeds a split threshold 7003, splits the split target area into a plurality of clusters (partial areas) at least one or more times, and, among the plurality of partial areas obtained with the split, manages the cluster in which the access count exceeded the split threshold 7003 as a non-compression target area, and manages the cluster in which the access count is less than the split threshold 7003 as a compression target area.

Meanwhile, upon transferring a file through a network, generally speaking, there are cases of adopting a method of reading a file and sending the read file to another computer based on the processing of a program.

For example, upon transferring a compressed file to another computer through HTTP (Hypertext Transfer Protocol) based on the processing of a program, if the HTTP client program 21003 of the HTTP client 21001 or the HTTP server program 21004 of the HTTP server 210002 reads the compressed file 8001, the file system of the HTTP client 21001 or the HTTP server 210002 executes decompression processing to the read file 8001, and the HTTP client program 21003 or the HTTP server program 21004 thereafter sends the decompressed file 8001 to the computer (HTTP server 210002 or HTTP client 21001) of the transfer destination.

Here, if the computer of the file transfer destination is equipped with a file compression function, the sending-side computer will decompress and receive the compressed file 8001, and the receiving-side computer will once again compress the file 8001. In other words, it would be wasteful for the "decompression processing" and "compression processing" to be repeated in the sending-side computer and the receiving-side computer.

Thus, in this embodiment, the repetition of the decompression processing and the compression processing is prevented by transferring the compressed file 8001 in a compressed state. In addition, the transfer efficiency is also improved by transferring the compressed file 8001 in a compressed state.

Specifically, the memory of the HTTP client 21001 stores an HTTP client program 21003 for respectively executing a PUT request of sending the file 8001 to the HTTP server program 21004 of the HTTP server 21002, and a GET request for sending a file acquisition request to the HTTP server program 21004 of the HTTP server 21002.

The processing of the HTTP client program 21003 that runs on a computer equipped with a file compression function sending a PUT request to the HTTP server program 21004 that runs on a computer equipped with a file compression function is foremost explained with reference to FIG. 21.

The HTTP client program 21003 needs to read information for managing the file 8001 and cluster information concerning the configuration of the file 8001; for example, the extent management data 8006, and the compressed file 8001 in a compressed state. Thus, the HTTP client program 21003 executes processing for notifying the file system program 3004 that it is necessary to acquire the cluster information created from the extent management data 8006 and read the compressed file 8001 in a compressed state.

This processing may use, for example, ioctl which is broadly supported by UNIX (registered trademark). An example is shown below.

int ioctl(file_descriptor,request_id,cluster_info)            (D1)

Format (D1) is the cluster acquisition notification interface to the file system program 3004 file system program 3004 using ioctl. file_descriptor is the file descriptor of the file 8001 transferred by the HTTP client program 20003. request_id is the ID (Identifier) that indicates the acquisition of cluster information, cluster_info is the pointer showing the memory address storing the cluster information acquired with the processing of the file system program 3004.

When the HTTP client program 21003 executes Format (D1), the file system program 3004 stores the cluster information in cluster_info and returns it to the HTTP client program 21003.

Subsequently, the HTTP client program 20003 reads the compressed file 8001 in a compressed state as the compressed file.

After executing Format (D1), if the HTTP client program 21003 executes the file read process (READ), the file system program 3004 returns the compressed file 8001 to the HTTP client program 21003. The HTTP client program 21003 is thereby able to read the compressed file 8001.

Subsequently, the HTTP client program 21003 sets cluster information to the HTTP header 21005, and sends the compressed file 8001 as a compressed file to the HTTP server program 21004. In other words, the HTTP client program 21003 sets cluster information to the HTTP header 21005 as the transmission information for sending the compressed file 8001 as a compressed file, and sends this to the HTTP server 21002 via network switch 1002.

For example, the header to be added to the HTTP header 21005 will be format (D2) shown below.

x-extent-info: no=1,offset=0,len=30,compress=y,com-
        pressed-size=20,                                          (D2)

"no" shows the cluster number. "offset" shows the offset 8008 of the cluster. "len" shows the original cluster length 8009. "compress" shows the compression flag 8014 of the cluster compression flag 8014. "compressed-size" shows the cluster size 8010 after compression.

As described above, the HTTP client program 21003 sends the cluster information that is required concerning the file 8001 to the HTTP server program 21004.

Subsequently, the HTTP server program 21004 sends the compressed file 8001 and the cluster information (for example, the extent management data 8006) to the file system program 3004. As the interface to realize the above, for example, ioctl may be used. An example of the interface is shown below.

int ioctl(file_descriptor,request_id,data)                    (D3)

Format (D3) is an interface for creating the file 8001 configuring the cluster by using ioctl. "file_descriptor" is the file descriptor that is newly created for the file 8001 to be sent with a computer on which the HTTP server program 21004 is running. "request_id" is the ID showing the creation of the file 8001 configuring the cluster. "data" is the pointer showing the cluster information added to the HTTP header 21005 and the memory address storing the compressed file 8001.

When the file system program 3004 receives the cluster information and the compressed file 8001 based on Format (D3), it creates a file 8001 to be stored in the disk 4005 of the HTTP server 21002 based on the received information, and stores the created file 8001 as a compressed file in the disk 4005.

Finally, the HTTP client program 21003 creates a dummy file 8001D including a description of the cluster information of the file 8001, and stores the created dummy file 8001D in the disk 4005. The dummy file 8001D is used in the HTTP GET request described later.

Figure 22:
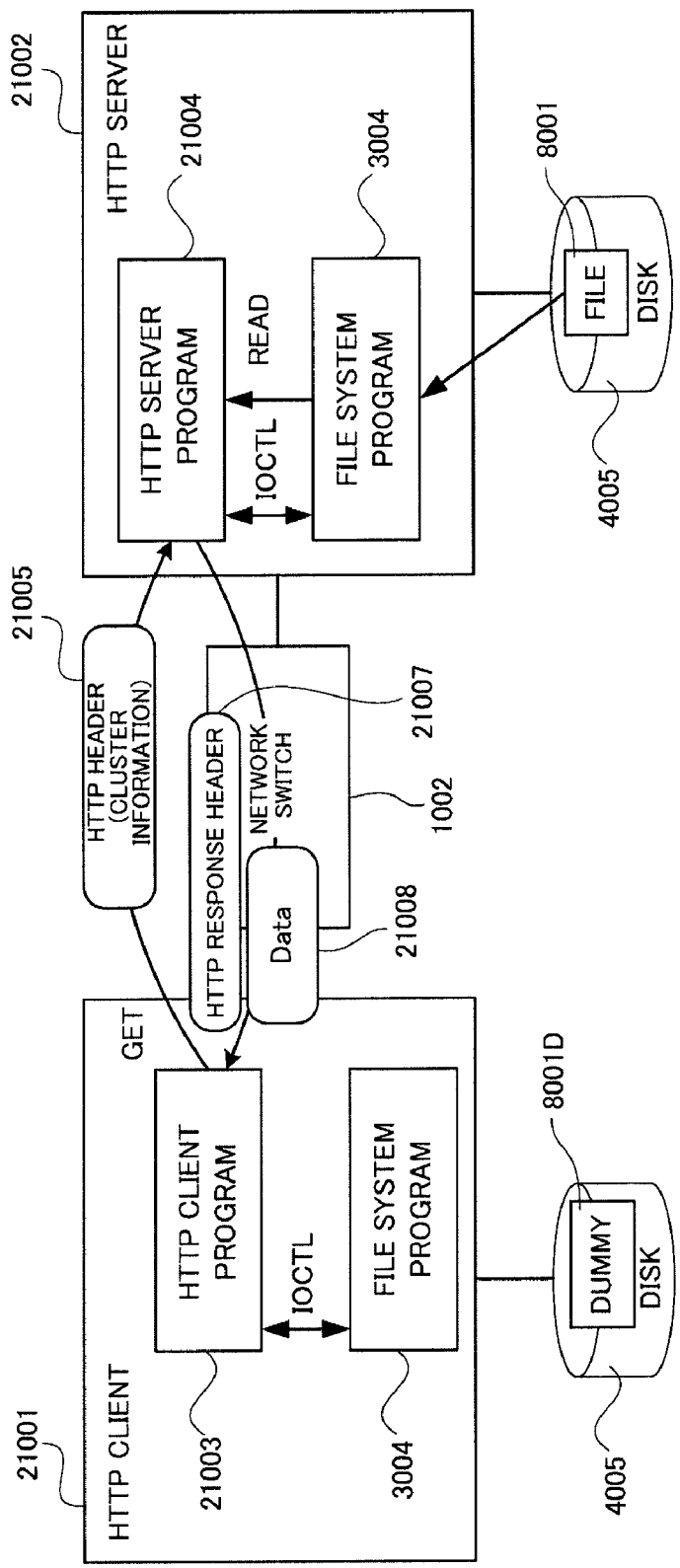
FIG. 22 is a schematic diagram showing a situation of the compressed file being subject to GET through HTTP.

The GET request processing is now explained with reference to FIG. 22.

The HTTP client program 21003 acquires only the clusters containing the data range of the file 8001 that was acquired from the HTTP server program 21004.

Here, the HTTP client program 21003 is storing the extent management data 8006 of the file 8001 in the dummy file 8001D.

Foremost, the HTTP client program 21003 specifies the clusters that are needed for decompression based on the range of data acquired from the HTTP server program 21004.

The HTTP client program 21003 thereafter adds, to the HTTP header 21005, cluster information obtained from the dummy file 8001D, for example, adds the extent management data 8006 as the cluster information of the specified cluster, and sends an HTTP GET request. Examples of the HTTP header 21005 are shown below.

x-extent-get: extent2,extent3                                 (D4)

x-extent-compressed: yes                                      (D5)

"extentN" of format (D4) is an additional header for requesting N-number of clusters.

Format (D5) is an additional header for requesting the transfer of the compressed file 8001.

The HTTP server program 21004 that received the HTTP header 21005 shown in format (D4) and format (D5) uses format (D1) to receive the compressed file 8001 from the file system program 3004.

Thereafter, the HTTP server program 21004 adds the data 21008 of the compressed file 8001 to the examples of the HTTP reply header 21007 shown below, and sends this to the HTTP client program 21003 of the HTTP client 21001.

x-extent-get-ret: extent2,extent3                             (D6)

x-extent-compressed-ret: yes                                  (D7)

"extentN" of format (D4) is an additional reply header showing the transmission of N-number of clusters. Format (D5) is an additional reply header showing the transfer of the compressed file 8001.

The HTTP client program 21003 is able to confirm that the data 21008 of the compressed file 8001 has been properly received by receiving the HTTP reply header 21007 shown in format (D6) and format (D7).

According to this embodiment, in a file transfer through a network, it is possible to reduce the decompression and compression of the file 8001, and improve the transfer efficiency of the file 8001.

Moreover, according to this embodiment, it is possible to improve the transfer efficiency of the file 8001 by receiving only the required clusters of the compressed file 8001.

(Fourth Embodiment)

This embodiment adds, to the OS (Operating System) loaded on the memory 3002 of the file server 1003, a function as a cache memory for temporarily storing data (compressed data or uncompressed data) that was read from the disk storage 1004, and provides the memory 3002 with a decompressed data storage memory for storing the decompressed data which was decompressed among the compressed data stored in the cache memory.

Here, if the processing request is a decompression request, the CPU 3001 of the file server 1003 decompresses the compressed data stored in the cache memory and stores this in the decompressed data storage memory, transfers the decompressed data stored in the decompressed data storage memory to the processing request source, and deletes the compressed data stored in the cache memory.

If a program reads a file in the file server 1003, the file system program 3004 equipped with the file compression function decompresses the data stored in the cache memory, and returns the data after decompression to the compression/decompression program 3006.

Here, since the data after decompression will be larger than the data before decompression, the file system program 3004 needs to prepare a memory that is separate from the cache memory, and store the data after decompression in such separate memory.

Meanwhile, after decompressing the data, the data before decompression stored in the cache memory is no longer necessary. Thus, after the file system program 3004 decompresses the data, the CPU 3001 immediately deletes the data before compression from the cache memory. The file server 1003 is thereby able to use the memory 3002 effectively.

(Fifth Embodiment)

This embodiment reads, from the disk storage 1004, a part of the data corresponding to the cluster that is managed as the compression target area, compresses the read partial data, calculates a compression ratio of the compressed partial data, and compresses the data corresponding to the cluster that is managed as the compression target area on the condition that the calculated compression ratio is greater than a compression ratio threshold.

In the first embodiment, upon compressing the data corresponding to the file 8001, a case was explained where the compression management program 3005 compressed data only when the file size exceeded a given value (compression start size threshold).

Meanwhile, in this embodiment, only partial data is compressed prior to compressing all data if the file size of the cluster managed as a compression target area exceeds a given size, the compression ratio of data of all clusters to be compressed and the compressed data is calculated, and data corresponding to the cluster managed as a compression target area is compressed on the condition that the calculated compression ratio is greater than the compression ratio threshold.

Here, for example, data of 4 kB as data block unit of the file system is compressed as a sample. As a result of subsequently calculating the compression ratio of the compressed data and the data of all clusters to be compressed, whether to compress all clusters is determined. Note that, in this processing, it is assumed that the partial compression ratio is approximate to the overall compression ratio.

According to this embodiment, since only partial data is compressed prior to compressing all data if the file size of the cluster managed as a compression target area exceeds a given size, the compression ratio of data of all clusters to be compressed and the compressed data is calculated, and data corresponding to the cluster managed as a compression target area is compressed on the condition that the calculated compression ratio is greater than the compression ratio threshold, the compression efficiency can be further improved.

Note that the present invention is not limited to the foregoing embodiments, and covers the various modified examples thereof. For example, the foregoing embodiments were explained in detail in order to facilitate the understanding of the present invention, and the present invention is not necessarily limited to comprising the entire configuration that was explained above. Moreover, a part of a configuration of a certain embodiment may be substituted for a configuration of another embodiment, or a configuration of a certain embodiment may be added to a configuration of another embodiment. Moreover, a part of a configuration of the respective embodiments may be the addition, deletion or substitution of another configuration.

Moreover, although the foregoing embodiments were explained using the term "program" as the subject, a program is able to performed predetermined processing by using a memory or the like as a result of being executed by a CPU (processor). Moreover, processing that was disclosed with a program as the subject may be processing that is performed by a computer such as a management terminal or a client. Moreover, a part of or the entire program may be realized with dedicated hardware. Moreover, the respective programs may be installed in the respective computers with a program distribution server or a storage media.

Moreover, a part or all of the respective configurations, functions, processing units, processing means and the like described above may be realized with hardware by designing an integrated circuit or the like. Moreover, the respective configurations, functions and the like described above may be realized with software by a processor interpreting and executing the programs for realizing the respective functions. Information such as programs, tables, files and the like for realizing the respective functions may be recorded and stored in a memory, a recording device such as a hard disk, or a recording medium such as an IC card, a SD card, or a DVD.

Reference Signs List

1001: Client
1002: Network switch
1003: File server
1004: Disk storage
1005: Management terminal
3001: CPU
3002: Memory
3007: File management data
3008: Compression management data
8001: File
8003, 8004: Cluster

The invention claimed is:

1. A file management method of a system including a storage device for storing a data group configuring a file as compressed data or uncompressed data, and a controller for controlling processing to be performed to the file based on a processing request from a processing request source,
   wherein the controller,
      records an access count by associating it with an area of the file if the processing request is a file access request,
      manages an area of the file as a split target area if the recorded access count exceeds a split threshold,
      splits the split target area into a plurality of partial areas at least one or more times, and, among the plurality of partial areas obtained with the split,
      manages the partial area in which the access count exceeded the split threshold as a non-compression target area, and
      manages a partial area in which the access count is less than the split threshold as a compression target area;
   wherein, upon transferring the file, the controller adds, to first transmission information to be transmitted as a first compressed file obtained by compressing the file, first cluster information for managing the first compressed file and sends this to a network, and stores a first dummy file including a description of the first cluster information in the storage device,
   wherein, upon receiving the first transmission information and the first cluster information via the network, another controller creates a second compressed file that was compressed as a second file from the first compressed file and the first cluster information belonging to the first transmission information, wherein, upon reading the second file, the controller adds, to a first transfer request of a second compressed file that was compressed as the second file, the first cluster information obtained from the first dummy file and sends this to the network, and wherein, upon receiving the first transfer request via the network, the other controller reads the second compressed file based on the first cluster information that was added to the first transfer request, and sends data of the read second compressed file, together with reply information, to the controller via the network.

2. The file management method according to claim 1, wherein the controller, reads, from the storage device, data corresponding to the partial area that is managed as the non-compression target area among the partial areas, stores the read data as the uncompressed data in the storage device, reads from the storage device and compresses data corresponding to the partial area that is managed as the compression target area among the partial areas, and stores the data that was compressed as the compressed data in the storage device.

3. The file management method according to claim 2, wherein the controller, manages information including a file extension and a compression start file size threshold as compression management data by associating it with the file, and if an extension assigned to the partial area that is managed as the compression target area among the partial areas coincides with the file extension that is managed with the compression management data, compares a file size of the partial area that is managed as the compression target area among the partial areas and the compression start file size threshold that is managed with the compression management data, and compresses data corresponding to the partial area that is managed as the compression target data on the condition that the file size of the partial area that is managed as the compression target area is greater than the compression start file size threshold that is managed with the compression management data.

4. The file management method according to claim 3, wherein the controller, reads, from the storage device, a part of the data corresponding to the partial area that is managed as the compression target area, compresses the read partial data, calculates a compression ratio of the compressed partial data, and compresses the data corresponding to the partial area that is managed as the compression target area on the condition that the calculated compression ratio is greater than a compression ratio threshold.

5. The file management method according to claim 2, wherein the controller, manages a cache memory for temporarily storing the compressed data or the uncompressed data that was read from the storage device, and a decompressed data storage memory for storing decompressed data that was decompressed among the compressed data stored in the cache memory, and if the processing request is a decompression request, the controller decompresses the compressed data stored in the cache memory and stores it as the decompressed data in the decompressed data storage memory, transfers the decompressed data stored in the decompressed data storage memory to the processing request source, and deletes the compressed data stored in the cache memory.

6. The file management method according to claim 1, wherein the controller, splits the split target area until the partial area among the plurality of partial areas obtained with the split in which the access count exceeded the split threshold is extracted as a minimum partial area.

7. The file management method according to claim 6, wherein the controller, if there are a plurality of partial areas that are managed as the compression target among a plurality of partial areas obtained with the split, respectively combines the plurality of partial areas, reads data corresponding to the combined partial areas from the storage device, collectively compresses the read data, and stores the data that was compressed as the compressed data in the storage device.

8. The file management method according to claim 7, wherein the controller, respectively combines the plurality of partials areas on the condition that the processing request is a change request for requesting the change of setting of the file.

9. The file management method according to claim 7, wherein the controller, respectively combines the plurality of partials areas on the condition that the processing request is an end request for requesting the end of use of the file.

10. A computer system, comprising:

a first computer including a first storage device for storing a first file, and a first controller for controlling I/O processing of data to and from the first storage device; and a second computer including a second storage device for storing a second file, and a second controller for sending and receiving information to and from the first controller via a network, and controlling I/O processing of data to and from the second storage device, wherein the first controller outputs a processing request to the second controller as a processing request source of the second controller, and wherein the second controller, records an access count by associating it with an area of the second file if the processing request is a file access request, manages an area of the second file as a split target area if the recorded access count exceeds a split threshold, splits the split target area into a plurality of partial areas at least one or more times, and, among the plurality of partial areas obtained with the split, manages the partial area in which the access count exceeded the split threshold as a non-compression target area, and manages a partial area in which the access count is less than the split threshold as a compression target area;

wherein, upon transferring the first file from the first computer to the second computer, the first controller adds, to first transmission information to be transmitted as a first compressed file obtained by compressing the first file, first cluster information for managing the first compressed file and sends this to the network, and stores a first dummy file including a description of the first cluster information in the first storage device, wherein, upon receiving the first transmission information and the first cluster information via the network, the second controller creates a second compressed file that was compressed as the second file from the first compressed file and the first cluster information belonging to the first transmission information, wherein, upon reading the second file from the first computer to the second computer, the first controller adds, to a first transfer request of a second compressed file that was compressed as the second file, the first cluster information obtained from the first dummy file and sends this to the network, and wherein, upon receiving the first transfer request via the network, the second other controller reads the second compressed file from the second storage device based on the first cluster information that was added to the first transfer request, and sends data of the read second compressed file, together with reply information, to the first controller via the network.

11. The computer system according to claim 10, wherein the second controller, reads, from the second storage device, data corresponding to the partial area that is managed as the non-compression target area among the partial areas, stores the read data as the uncompressed data in the second storage device, reads from the second storage device and compresses data corresponding to the partial area that is managed as the compression target area among the partial areas, and stores the data that was compressed as the compressed data in the second storage device.

12. The computer system according to claim 11, wherein the second controller, manages information including a file extension and a compression start file size threshold as compression management data by associating it with the file, and if an extension assigned to the partial area that is managed as the compression target area among the partial areas coincides with the file extension that is managed with the compression management data, compares a file size of the partial area that is managed as the compression target area among the partial areas and the compression start file size threshold that is managed with the compression management data, and compresses data corresponding to the partial area that is managed as the compression target data on the condition that the file size of the partial area that is managed as the compression target area is greater than the compression start file size threshold that is managed with the compression management data.

13. The computer system according to claim 12, wherein the second controller, includes an interface for setting the compression management data with the file extension and the compression start file size threshold as a pair.

14. The computer system according to claim 10, wherein the second controller, splits the split target area until the partial area among the plurality of partial areas obtained with the split in which the access count exceeded the split threshold is extracted as a minimum partial area.

* * * * *